(12) United States Patent
Black

(10) Patent No.: US 10,870,095 B2
(45) Date of Patent: Dec. 22, 2020

(54) MONITORING AND CONTROL MODULE FOR FLUID CATALYTIC CRACKING UNIT

(71) Applicant: BLAC INC., Elmhurst, IL (US)

(72) Inventor: Philip B. Black, Elmhurst, IL (US)

(73) Assignee: BLAC INC., Elmhurst, IL (US)

( * ) Notice: Subject to any disclaimer, the term of this patent is extended or adjusted under 35 U.S.C. 154(b) by 0 days.

(21) Appl. No.: 16/298,706

(22) Filed: Mar. 11, 2019

(65) Prior Publication Data

US 2019/0240634 A1 Aug. 8, 2019

Related U.S. Application Data

(63) Continuation of application No. 14/874,280, filed on Oct. 2, 2015, now Pat. No. 10,226,749.

(60) Provisional application No. 62/058,903, filed on Oct. 2, 2014.

(51) Int. Cl.
| B01J 8/24 | (2006.01) |
| C10G 11/18 | (2006.01) |
| B01J 8/18 | (2006.01) |
| B05B 1/30 | (2006.01) |
| B05B 7/04 | (2006.01) |
| B05B 7/12 | (2006.01) |

(52) U.S. Cl.
CPC .............. *B01J 8/24* (2013.01); *B01J 8/1809* (2013.01); *B01J 8/1827* (2013.01); *B01J 8/1872* (2013.01); *B05B 1/30* (2013.01); *B05B 7/04* (2013.01); *B05B 7/12* (2013.01); *C10G 11/18* (2013.01); *C10G 11/187* (2013.01); *B01J 2208/00902* (2013.01)

(58) Field of Classification Search
CPC . B01J 8/24; B01J 8/1809; B01J 8/1872; B01J 8/1827; B01J 2208/00902; C10G 11/187; C10G 11/18; B05B 7/12; B05B 7/04; B05B 1/30
See application file for complete search history.

(56) References Cited

U.S. PATENT DOCUMENTS

| 303,554 | A | 8/1884 | Becker |
| 335,404 | A | 2/1886 | Walsh et al. |
| 444,782 | A | 1/1891 | Moran |
| 694,880 | A | 3/1902 | Munger |
| 737,273 | A | 8/1903 | Reynolds |
| 751,869 | A | 2/1904 | Newton |
| 820,556 | A | 5/1906 | Cooke |
| 946,481 | A | 1/1910 | Anderson |
| 1,436,768 | A | 11/1922 | Mackie et al. |
| 1,490,884 | A | 4/1924 | Spreen |
| 1,799,667 | A | 4/1931 | Ziegler |
| 2,189,473 | A | 2/1940 | Poor |
| 2,260,253 | A | 10/1941 | Johnson |
| 2,260,523 | A | 10/1941 | Henry |

(Continued)

FOREIGN PATENT DOCUMENTS

WO WO 2011/150012 12/2011

*Primary Examiner* — Randy Boyer
*Assistant Examiner* — Juan C Valencia
(74) *Attorney, Agent, or Firm* — Barnes & Thornburg LLP; Mark J. Nahnsen

(57) ABSTRACT

A fluid catalytic cracking (FCC) unit for the production of hydrocarbon products includes a fluid injection system coupled to a reactor by a standpipe. The fluid injection system includes a plurality of nozzles for injecting oil feedstock into the standpipe to react with a catalyst flowing therethrough.

18 Claims, 20 Drawing Sheets

(56) References Cited

U.S. PATENT DOCUMENTS

| | | |
|---|---|---|
| 2,682,386 A | 6/1954 | Lindsay |
| 2,686,535 A | 8/1954 | Le Tourneau |
| 2,741,264 A | 4/1956 | Leonard |
| 2,934,090 A | 4/1960 | Kenann et al. |
| 2,981,290 A | 4/1961 | Meyer |
| 3,016,917 A | 1/1962 | Hunt |
| 3,070,125 A | 12/1962 | Gulley |
| 3,071,540 A | 1/1963 | McMahon et al. |
| 3,116,020 A | 12/1963 | Rosen |
| 3,166,358 A | 1/1965 | Valentine |
| 3,329,165 A | 7/1967 | Lang |
| 3,382,894 A | 5/1968 | Shurtleff et al. |
| 3,506,035 A | 4/1970 | Chabrier |
| 3,511,260 A | 5/1970 | Benjamin |
| 3,654,140 A | 4/1972 | Griffel et al. |
| 3,679,169 A | 7/1972 | Bedo et al. |
| 3,727,631 A | 4/1973 | Suezawa et al. |
| 3,731,905 A | 5/1973 | Piet |
| 3,776,510 A | 12/1973 | Beck |
| 3,857,410 A | 12/1974 | Bedo et al. |
| 3,874,414 A | 4/1975 | Dollison |
| 3,990,466 A | 11/1976 | Sanders |
| 4,051,862 A | 10/1977 | Haytayan |
| 4,098,295 A | 7/1978 | Haytayan |
| 4,128,110 A | 12/1978 | Haytayan |
| 4,414,995 A | 11/1983 | Spencer |
| 4,454,892 A | 6/1984 | Chadshay |
| 4,711,270 A | 12/1987 | Fornasari |
| 4,726,398 A | 2/1988 | Barree |
| 4,808,383 A | 2/1989 | Buyan et al. |
| 4,823,840 A | 4/1989 | Kosugi et al. |
| 4,880,033 A | 11/1989 | Neff |
| 5,108,583 A | 4/1992 | Keon |
| 5,139,748 A | 8/1992 | Lomas et al. |
| 5,297,442 A | 3/1994 | Wolf et al. |
| 5,298,155 A | 3/1994 | Sabottke |
| 5,332,618 A | 7/1994 | Austin |
| 5,397,442 A * | 3/1995 | Wachsman ......... G01N 27/4074 205/781 |
| 5,497,806 A | 3/1996 | Swank et al. |
| 5,762,094 A | 6/1998 | Hendershot et al. |
| 6,237,634 B1 | 5/2001 | Narita et al. |
| 6,627,161 B1 | 9/2003 | Radcliffe et al. |
| 7,025,874 B2 | 4/2006 | Chan et al. |
| 8,999,246 B2 * | 4/2015 | Chan ..................... C10G 9/005 422/139 |
| 2003/0106594 A1 | 6/2003 | Saurwein et al. |

* cited by examiner

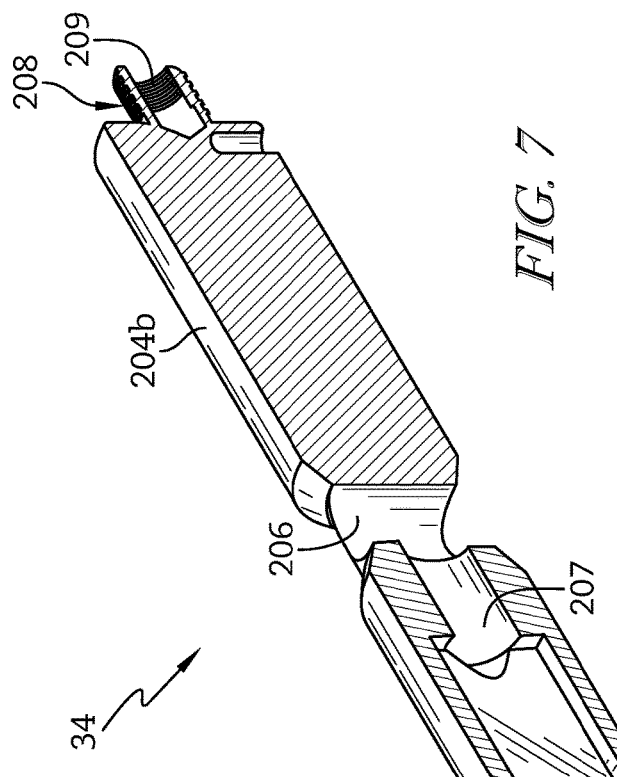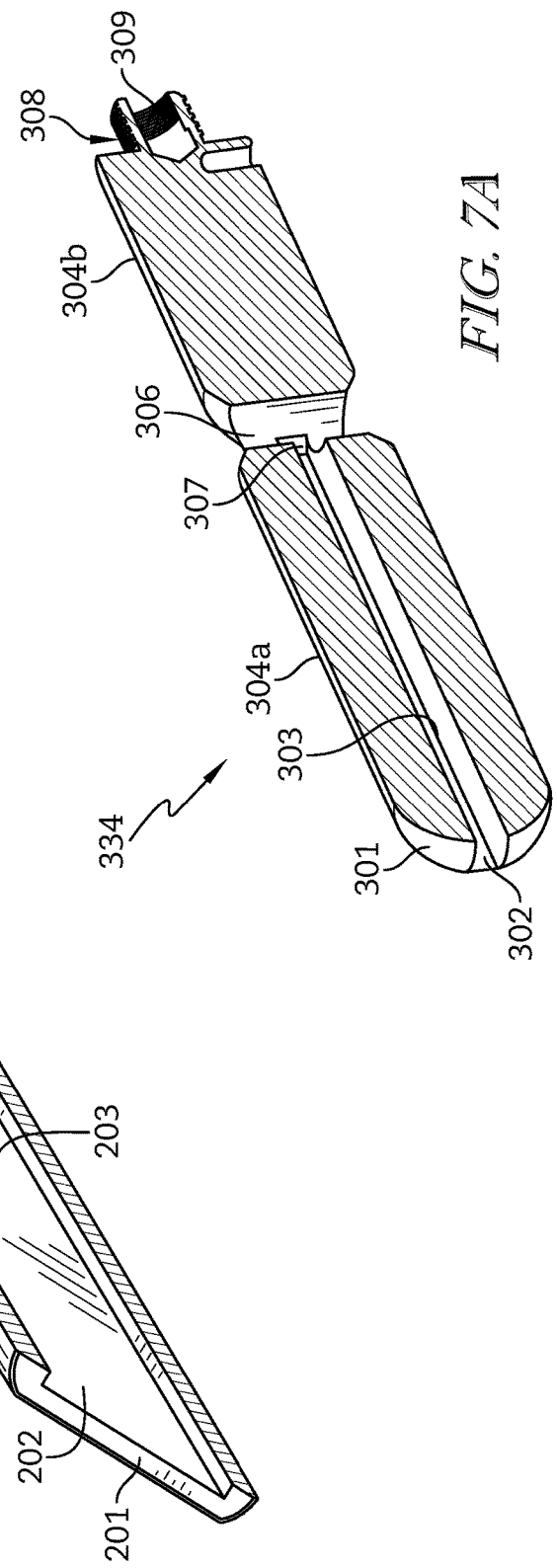

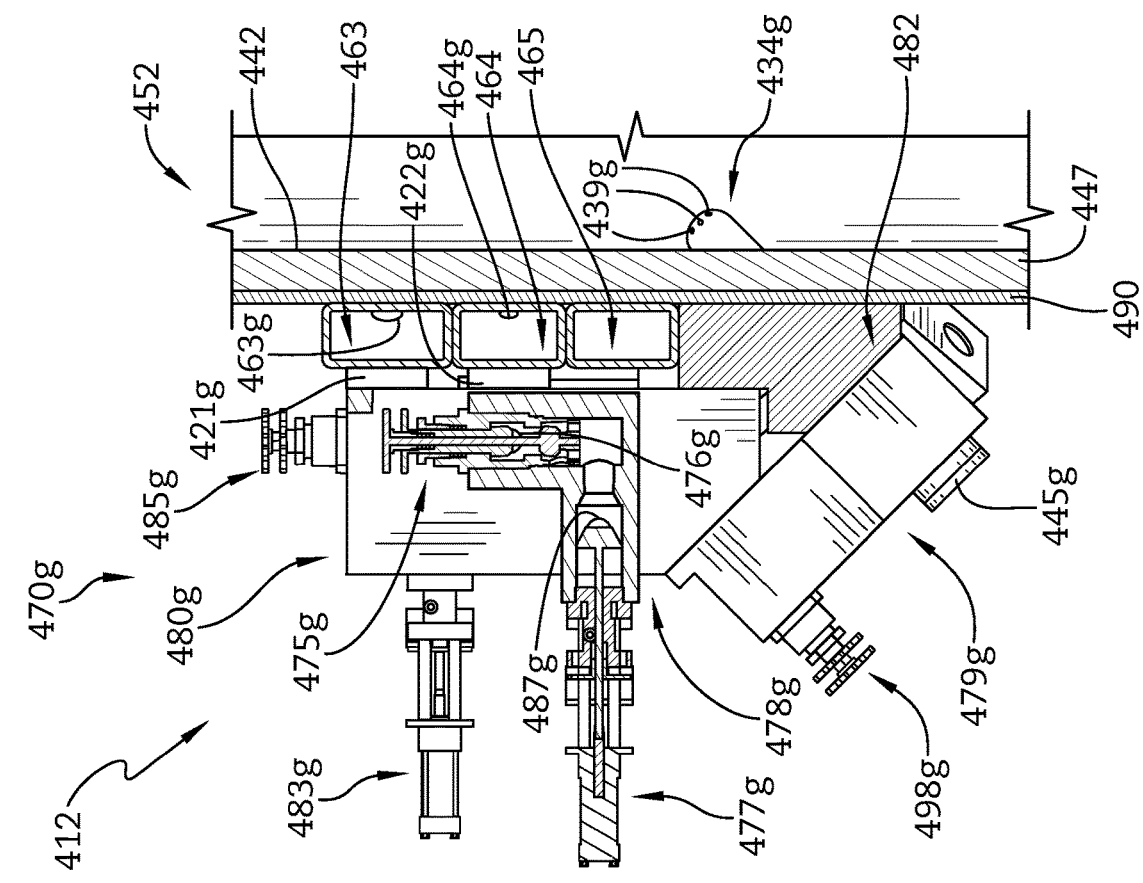
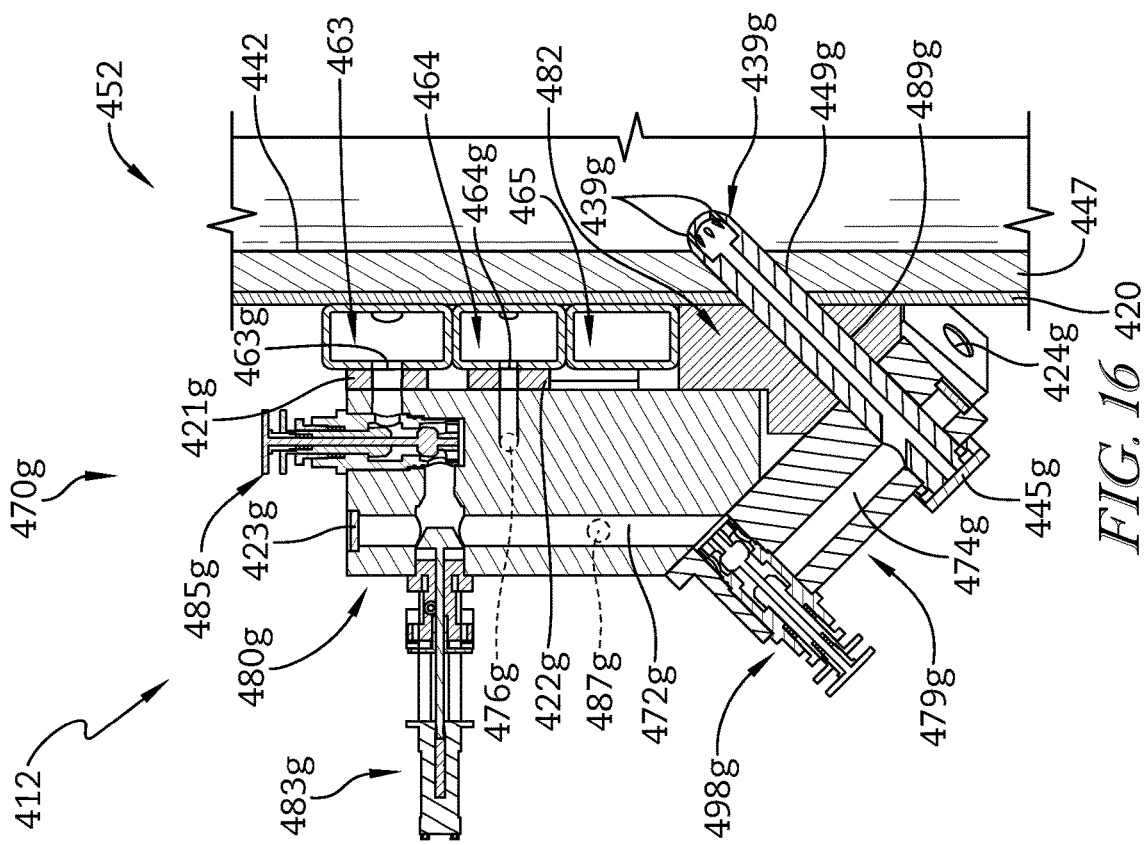
FIG. 17
FIG. 16

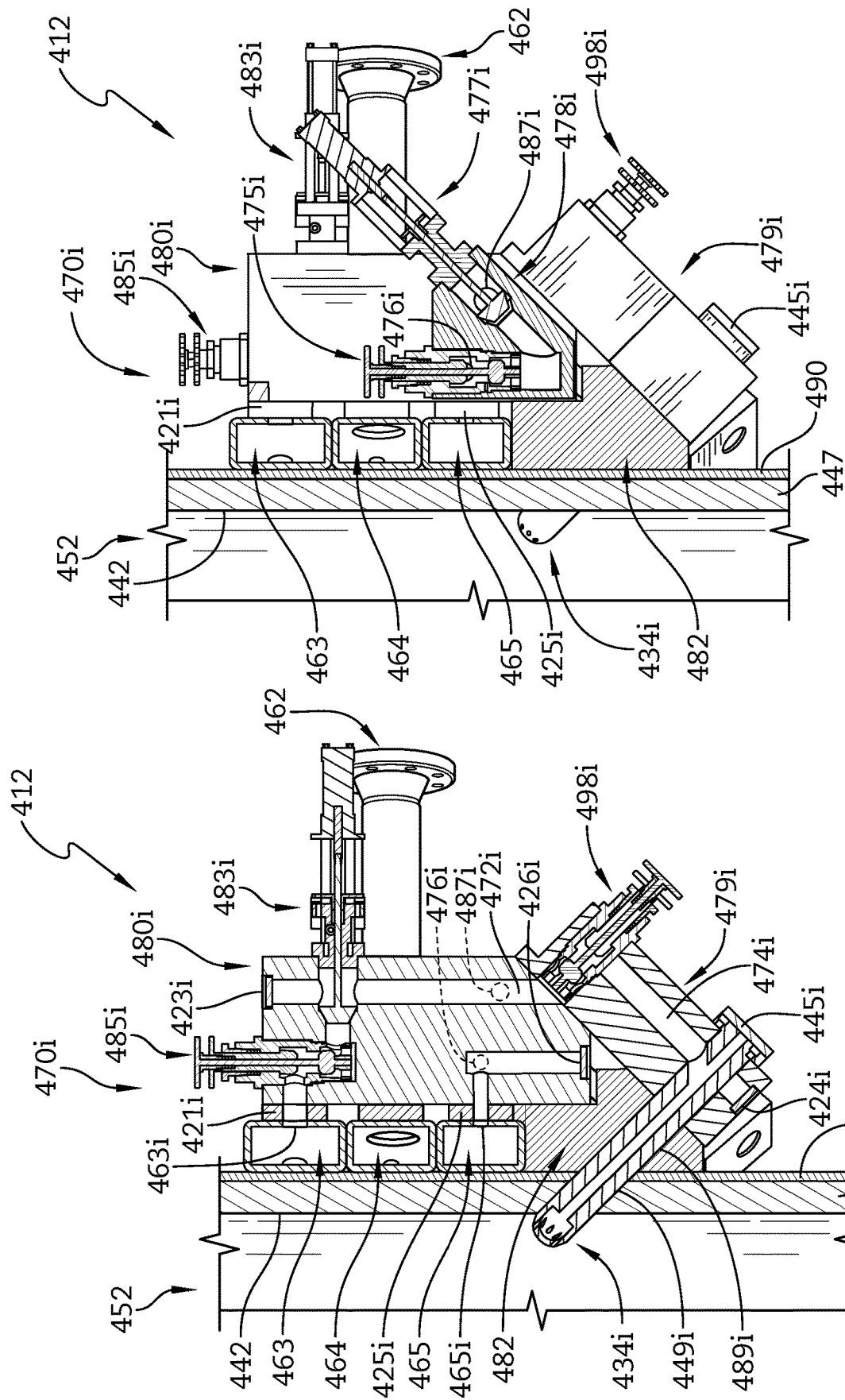

MONITORING AND CONTROL MODULE FOR FLUID CATALYTIC CRACKING UNIT

CROSS-REFERENCE TO RELATED APPLICATION

This application is a Continuation of copending U.S. patent application Ser. No. 14/874,280, filed Oct. 2, 2015, which claims the benefit of and priority to U.S. Provisional Patent Application Ser. No. 62/058,903, filed Oct. 2, 2014. The disclosures set forth in the referenced applications are incorporated herein by reference in their entireties.

BACKGROUND

The present disclosure relates to an apparatus for use in continuous cyclical processes employing fluidized solid techniques, such as a hydrocarbon fluid catalytic cracking (FCC) process, and is particularly directed to an injector module for introducing feedstocks into a reactor vessel for carrying out FCC processes.

Fluid catalytic cracking (FCC) processes are used in the refining of petroleum for producing various products such as low boiling point hydrocarbon products, especially gasoline, from relatively higher boiling feeds, or feedstocks. There are two pathways for the feed to crack into gaseous hydrocarbons, i.e., catalytic and thermal. Thermal cracking in a FCC reactor is generally undesirable as this type of cracking can result in the generation of light gases such as methane in addition to coke.

Various approaches have been adapted to rapidly break up the fluid feedstock vaporization. One approach involves the spraying of feedstock oil against a bolt head under pressure to fracture the feedstock. Steam is then used to carry the fractured particles out through a nozzle into the catalyst flow of the riser section of the FCC reactor. With this approach hydrocarbon feedstock is directed in a substantially perpendicular direction to the flowing stream of catalyst particles and onto a central strike surface on a target cylinder for disbursing the mixture of hydrocarbons and catalyst particles within the FCC reactor. Another approach uses steam flowing into a chamber with the feedstock oil, with the two flows of particles mixing and then flowing through an orifice, or a restricting nozzle, to atomize the mixed fluid. A third approach uses a twisting or spiral shaped nozzle to fracture the feedstock oil, with steam then added to carry the feedstock oil into the path of the catalyst.

In all of these installations, the feed injection nozzles and their mounting arrangements have various known issues. For example, the feed injection nozzles are subject to erosion and are easily and quickly degraded by the chemically-active catalysts. The nozzle arrangements are sometimes installed at different levels within the riser, with typically 4 to 12 nozzles at each level. Each nozzle projects onto the riser pipe wall and through the refractory lining on the inside of the riser pipe, with each of the nozzles having piping attached thereto for the delivery of feedstock and steam, and sometimes this piping includes drains or "rod out" ports. This nozzle and piping arrangement is very complex, requiring isolation valves and support piping, is very large in size, and is expensive.

If a first nozzle fails in a typical arrangement, a second oppositely positioned nozzle sprays high velocity fuel with catalyst onto the opposite side of the riser where the first failed nozzle is located, causing erosive or corrosive problems with the refractory lining and/or wall of the riser. This can cause catastrophic failure of the FCC process and dangerous operating conditions for plant personnel. Excessive heating of a nozzle assembly located on the riser is a dangerous condition for plant personnel who can be easily injured if required to operate a valve or perform other operational or maintenance functions on or near the riser. Nozzles can be very expensive, as is the cost to install a replacement nozzle in a riser. One of the reasons for this high cost is that the piping attached to each nozzle must match in position and orientation and must be properly positioned for connection to a nozzle in a very restrictive space involving complex piping. Typically there are 4 or 6 nozzles incorporated, and as you get bigger units, sometimes there is 8 or 10 nozzles, but in general there are no more than 10. There appears to be only one assembly in the world that has up to 14 nozzles in it.

Thus, there is a need for a FCC processing module that is durable and easily maintainable.

SUMMARY

The present disclosure provides a method and system for the injection of oil feedstock into a fluid catalytic cracking (FCC) unit used to produce various hydrocarbon products from the oil feedstock. The atomization, or breakdown, of the feedstock fluid into a small particle size is required in these processes, and the efficiency of the process is related to how well the feedstock oils are broken down and mixed with other materials to produce a valuable product.

According to the present disclosure, a fluid injection system includes an injector module coupled to a standpipe of a FCC unit and a data collection and control module (DCCM) which controls the injection of oil feedstock into the standpipe through the injector module. The injector module has a plurality of nozzles and valves to control a flow of working fluid through the nozzles. The nozzles are positioned to inject the working fluid into a standpipe where the oil feedstock reacts with a catalyst to break down the oil feedstock into various byproducts, including valuable hydrocarbon products.

In illustrative embodiments, the injector module includes a single body, or block, and a plurality of nozzles coupled to the block to extend into the standpipe. The block is formed to include an internal network of conduits for flowing the oil feedstock and other processing fluids through the nozzles.

In illustrative embodiments, the DCCM monitors and controls the flow, temperature, pressure, and particle size of the various fluids travelling through the block for distribution to each nozzle. The DCCM controls the injector module to provide accurate, independent operation of each nozzle.

In illustrative embodiments, the fluid injection system is configured to maximize the operating lifetime of the injector module through safe and efficient removal and replacement of feedstock nozzles, as well as for monitoring of nozzle wear and corrosion during operation to determine when a nozzle should be replaced before failure of the nozzle. The fluid injection system is also configured to maximize the reliability and operating lifetime of each nozzle by limiting exposure of the nozzle to the FCC reaction zone, thus minimizing the corrosion and erosion exposure levels while also reducing the nozzle's operating temperature and size.

In illustrative embodiments, the injector module includes a plurality of double block and bleed valves. The valves block a flow of fluid in two different seating positions, and provide a bleed port between the two seats, in a single unit. This minimizes the amount of space needed for the isolation of working fluid from the standpipe in a safe manner to meet refinery standards. The double block and bleed valves provide for the safe and effective shutting down of the injector module or individual nozzle, and the bleeding off of any residual pressure, for the purpose of performing maintenance, e.g., replacing a nozzle.

In illustrative embodiments, the fluid injection system maximizes yields from the FCC process by providing for the cool and stable operating temperatures for a high temperature hydrocarbon FCC process, which also increases safety for operators of the system. The fluid injection system also maximizes the number of feed nozzles for control over oil feedstock distribution and input, further increasing yields. Various feedstock nozzle configurations can be used to meet an FCC unit's configuration, including the use of multiple injector modules at multiple levels on the standpipe controlled by a single DCCM.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 7 is a longitudinal sectional view of one embodiment of an oil/steam nozzle used in the injector module;

FIG. 7A is a longitudinal sectional view of another embodiment of an oil/steam nozzle used in the injector module;

FIG. 16 is a sectional view taken along line 16-16 in FIG. 14;

FIG. 17 is a sectional view taken along line 17-17 in FIG. 14;

FIG. 18 is a sectional view taken along line 18-18 in FIG. 14; and

FIG. 19 is a sectional view taken along line 19-19 in FIG. 14.

DETAILED DESCRIPTION

Figure 1:
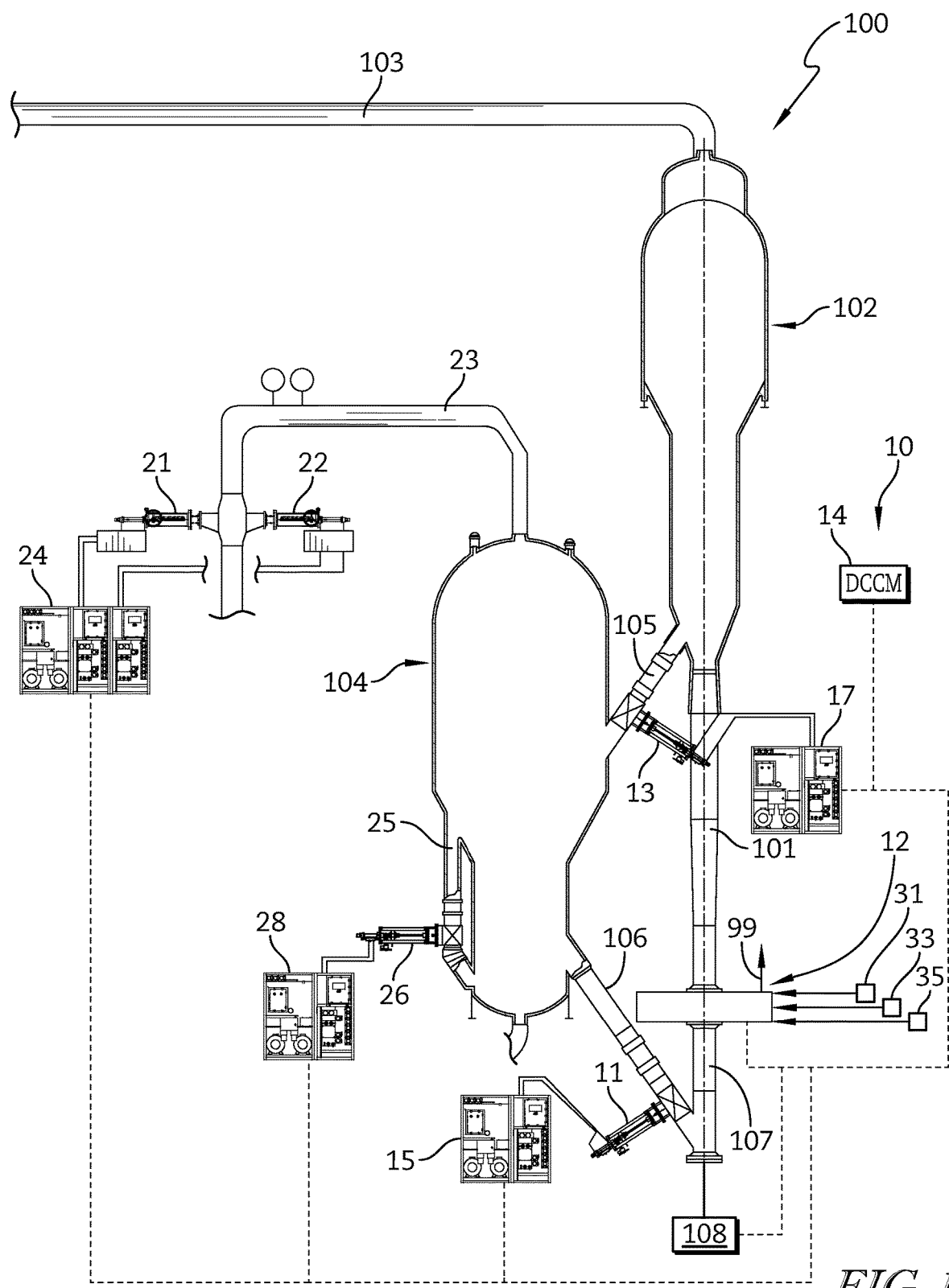
FIG. 1 is a diagrammatic view of a fluid catalytic cracking unit incorporating an injector module and a data collection and control module in accordance with the present disclosure.

An illustrative embodiment of a fluid catalytic cracking (FCC) unit 100 incorporating a fluid injection system 10 in accordance with the present disclosure is shown in FIG. 1. Fluid injection system 10 includes an injector module 12 and a data collection/control module (DCCM) 14 configured to monitor and control injector module 12. FCC unit 100 includes a reactor 102 and a standpipe 101 (sometimes referred to as a vertical riser section) coupled between reactor 102 and injector module 12.

In the illustrative embodiment, fluid injection system 10 is configured to provide feedstock oil, and other working fluids, into standpipe 101 where the feedstock oil reacts with catalyst particles flowing through standpipe 101 to break down the feedstock oil into various byproducts as suggested in FIG. 1. The catalyst particles and reacting feedstock oil is transferred into reactor 102 where some of the byproducts of the reaction process (sometimes called a cracking process) are gathered and sent through an outlet gas conduit 103 for further processing and refinement.

For example, in some embodiments, the reaction process produces hydrocarbon products. In some embodiments the reaction process produces low boiling point hydrocarbons, such as gasoline, gas oils, and/or gaseous hydrocarbons produced from higher boiling point hydrocarbons. In one illustrative embodiment, during the cracking process, relatively high boiling oil is converted to lighter oil and forms heating oils and gasoline, or even lighter hydrocarbons. The oil or hydrocarbon feedstock is contacted in one or more reaction zones within reactor 102 with the catalyst particles and is maintained in a fluidized state under conditions suitable for the above-described conversion of the hydrocarbons. In some embodiments, the catalyst particles are chemically active metallic particles formed to include a large surface area.

In the illustrative embodiment, injector module 12 is configured to provide a working fluid of feedstock oil and steam into standpipe 101 as suggested in FIG. 1. In some embodiments, residual oil products (sometimes called resid oil), which includes the remains of prior distillation processes of fuel oils and lighter hydrocarbons, is also optionally introduced as part of the working fluid. The steam operates to atomize the oil feed stock and optional resid oils at high temperatures and pressures to form the working fluid. This working fluid is directed into the standpipe 101 by injector module 12.

DCCM 14 monitors the cracking process and controls injector module 12 to optimize the composition and flow characteristics of the working fluid to maximize yields of the valuable reaction byproducts as suggested in FIG. 1. The working fluid and catalyst particles move through various reaction zones within reactor 102 producing the reaction byproducts. In some embodiments, oil deposited on the catalyst particles is least partially removed from by combustion in an oxygen-containing medium. In some embodiments, reaction byproducts pass through outlet gas conduit 103 to a fractionator (not shown), wherein hydrocarbon effluent is separated into components such as light gases and gasoline, light cycle oil, heavy cycle oil and slurry oil. Various contents of reactor 102 may also be recycled along with the feedstock oil to the injector module 12. These contents may include light gases and gasoline which are further separated and processed downstream of reactor 102.

The spent catalyst particles are separated from the reaction byproducts in reactor 102 and sent through a spent-catalyst pipe 105 into a regenerator 104 as suggested in FIG. 1. Regenerator 104 processes the spent catalyst particles to remove unwanted reaction byproducts so the catalyst particles can be reused in subsequent reactions. The regenerated catalyst particles are sent through a regenerated-catalyst pipe 106 to a connector section 107 coupled to injector module 12. In the illustrative embodiment, a lower portion of connector section 107 is coupled with a pressure source 108 configured to pressurize FCC unit 100 to move the catalyst particles toward reactor 102. In the illustrative embodiment, regenerator 104 is selectively separated from reactor 102 and connector section 107 by valves 11, 13 to control the flow of catalyst particles through FCC unit 100 as suggested in FIG. 1. Valves 11, 13 are electronically actuable through valve controllers 15, 17, respectively, which are controlled by DCCM 14.

In the illustrative embodiment, catalyst regenerator 104 includes a recirculation pipe 25 which controls the rate at which the catalyst is recirculated within catalyst regenerator 104 during regeneration of the spent catalyst as suggested in FIG. 1. Recirculation of the catalyst within the catalyst regenerator 104 is regulated by a catalyst recirculation valve 26 controlled by a recirculation catalyst controller 28 in connection with DCCM 14. A pressure control valve 21 and a differential pressure control valve 22 are connected to an upper portion of regenerator 104 by a pressure control pipe 23. Pressure control valve 21 and differential pressure control valve 22 regulate the pressure within the regenerator 104 and the differential pressure between regenerator 104 and the pressure within recirculation pipe 25, respectively. Pressure control valve 21 and differential pressure control valve 22 are coupled to and controlled by pressure controller 44 in connection with DCCM 14. Each of the aforementioned controllers 15, 17, 24, 28 is coupled to and receives control inputs from DCCM 14 as described in greater detail below.

Figure 2:
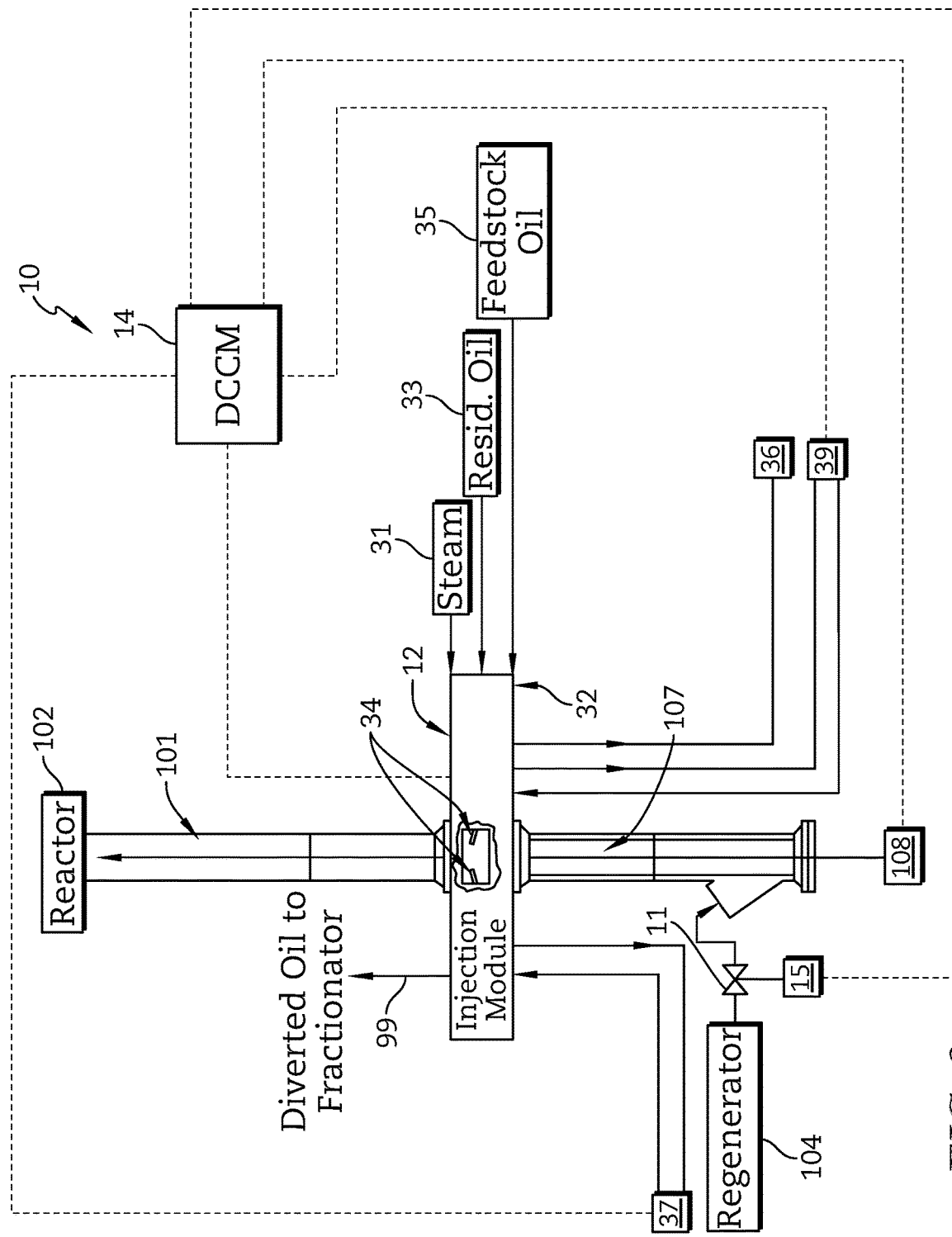
FIG. 2 is a diagrammatic view of a fluid injection system.

Injector module 12 includes a manifold 32 and a plurality of nozzles 34 as suggested in FIG. 2. A portion of manifold 32 is cut away to view nozzles 34. Manifold 32 is configured to receive inputs of feedstock oil 35, steam 31, and resid oil 33 and mix inputs 31, 33, 35 into a working fluid for distribution to nozzles 34. The working fluid passes through nozzles 34 into standpipe 101 to react with the catalyst particles and move toward reactor 102. Manifold 32 is connected with DCCM 14 to regulate the mixing and distribution of the working fluid to nozzles 34 as detailed further below.

In the illustrative embodiment, a condensate collector 36 is connected with manifold 32 to receive steam that condenses before distribution to nozzles 34 as suggested in FIG. 2. The heat produced through forming the working fluid is regulated by a water cooling system 39 connected to manifold 32 and controlled by DCCM 14. Manifold 32 includes a plurality of valves, as further discussed below, for regulating the distribution of inputs 31, 33, 35 through injector module 12. In some embodiments, the valves are operated hydraulically through a hydraulic fluid distribution system 37 controlled by DCCM 14.

Figure 3:
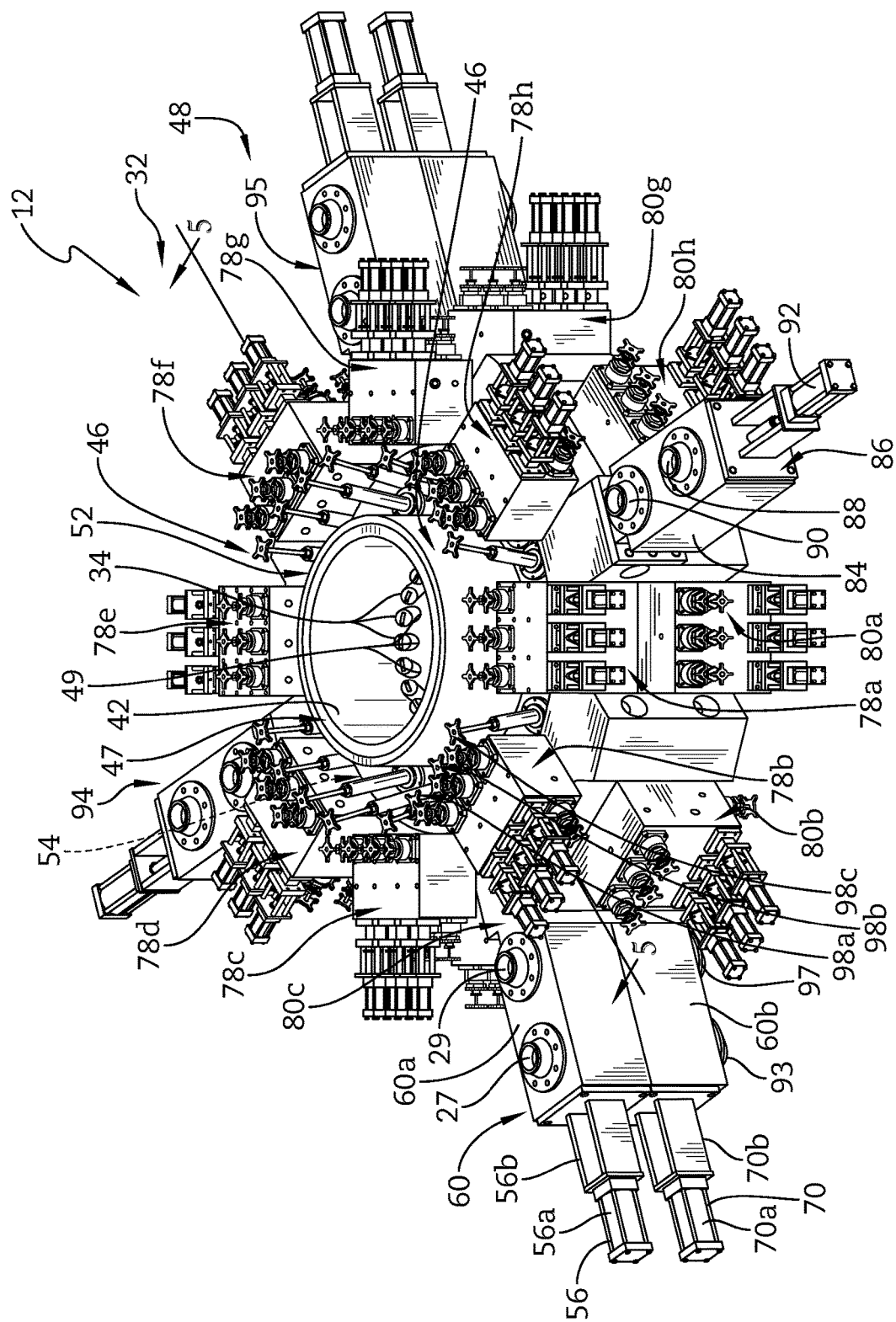
FIG. 3 is an upper perspective view of one embodiment of an injector module.
Figure 4:
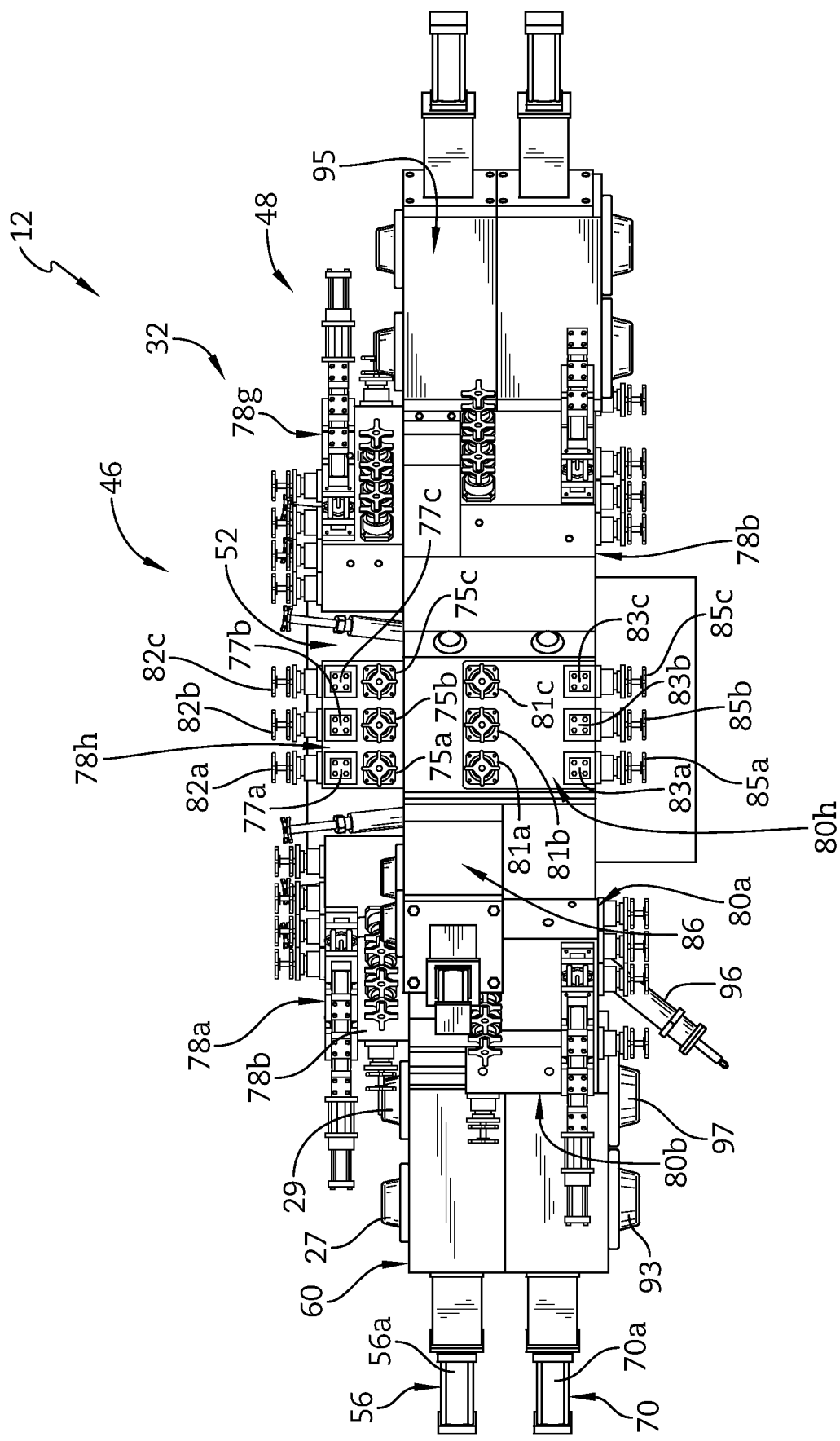
FIG. 4 is a side elevation view of the injector module of FIG. 3.
Figure 5:
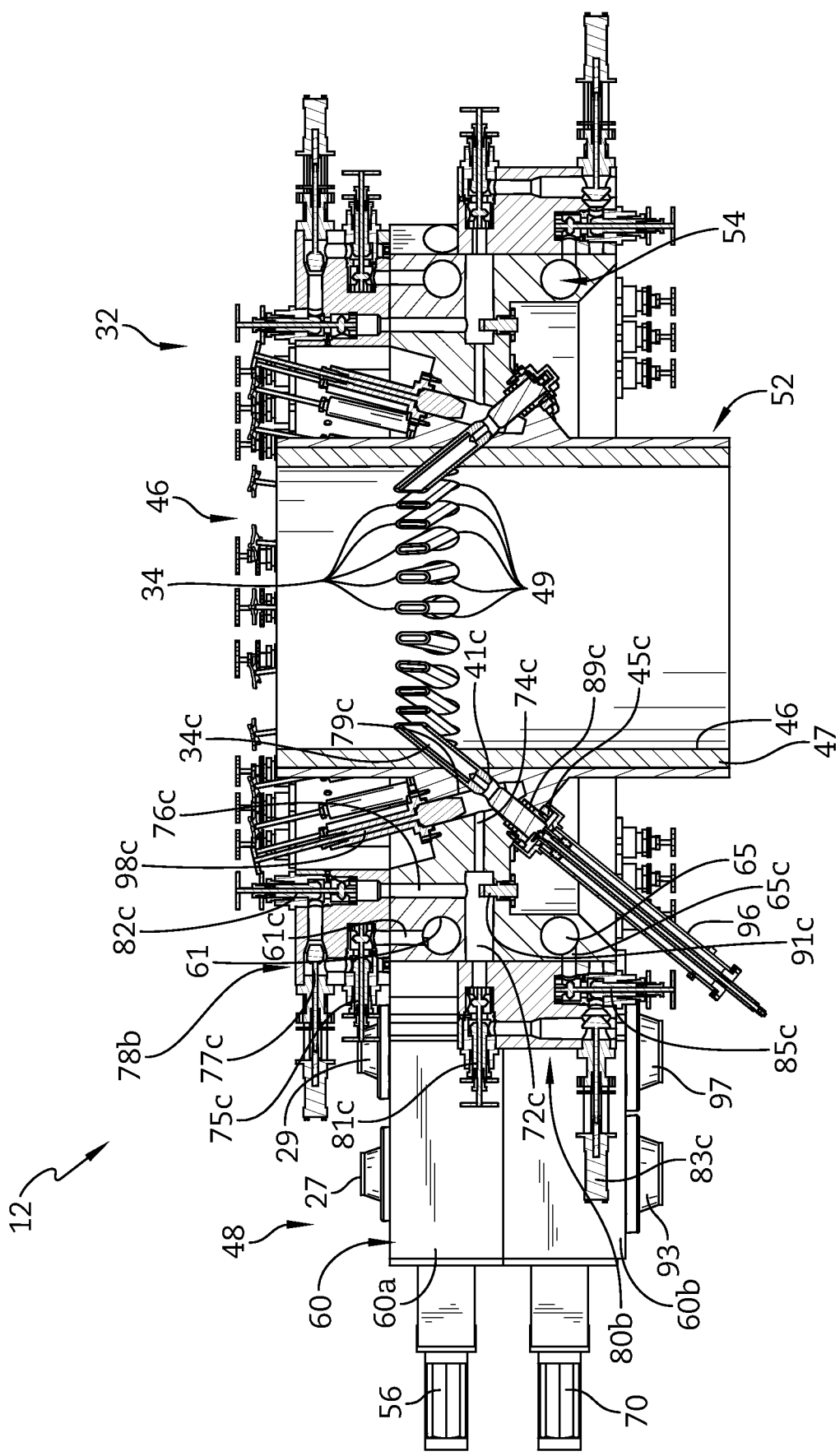
FIG. 5 is a sectional view taken along line 5-5 in FIG. 3.

Manifold 32 of injector module 12 is attached to and disposed about standpipe 101 as suggested in FIGS. 3-5. Manifold 32 includes a unitary body block 46 and a flow control assembly 48. Body block 46 is formed to include a plurality of internal passageways for distribution of fluids through manifold 32 as suggested in FIG. 6 and further detailed below. Flow control assembly 48 is operated by DCCM 14 and includes a plurality of multiflow oil control blocks 78a-78h and multiflow steam control blocks 80a-80h coupled to body block 46 to control the flow of fluids through body block 46 as suggested in FIG. 3. In the illustrative embodiment, diversion flow blocks 60, 95, 86, 94 are coupled to body block 46 and configured to receive fluid inputs of steam, feedstock oil, and resid oil for distribution through body block 46 as needed. Operation of diversion flow blocks 60, 95, 86, 94 is controlled by DCCM 14.

Figure 6:
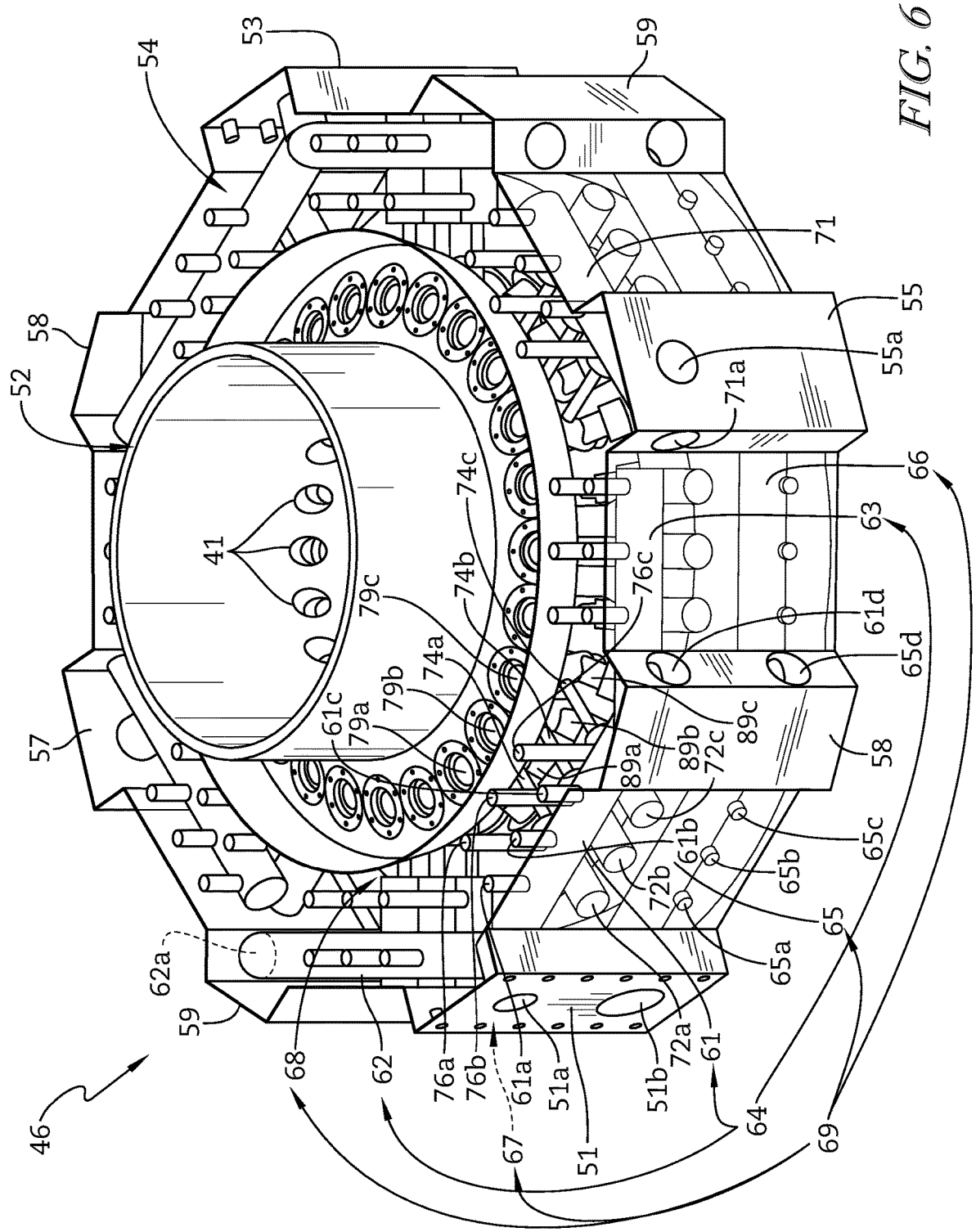
FIG. 6 is an upper perspective view of a body block of the injector module of FIG. 3.

Body block 46 includes a central tube 52 and a flow network 54 formed in body block 46 and in fluid communication with central tube 52 as suggested in FIG. 6. Flow network 54 includes a series of cross drilled bores extending into body block 46 from an outer surface such that openings into the bores are exposed. Flow network 54 is internal to body block 46, but is shown in solid line for clarity. Control blocks 78a-78h and 80a-80h, and diversion flow blocks 60, 95, 86, 94, are coupled to body block 46 to cover the exposed openings of the bores to control the direction of fluids flowing through flow network 54. The cross drilled bores define separate and distinct fluid passageways inside body block 46 to allow the various input fluids to flow separately from one another until they pass through control blocks 78a-78h and 80a-80h to reach mixing zones to form the working fluid for injection through nozzles 34 into standpipe 101 as suggested in FIGS. 3-6. As such, individualized external piping for each nozzle 34 is not required, allowing a footprint of injector module 12 to be minimized while minimizing the spacing between adjacent nozzles 34 so that more nozzles 34 can be included within standpipe 101.

A plurality of apertures 41 are formed through an inner surface 42 of central tube 52 and circumferentially spaced apart from one another to receive nozzles 34 as suggested in FIGS. 5 and 6. Central tube 52 is coupled to standpipe 101 such that apertures 41 formed through central tube 52 align with apertures 49 formed through standpipe 101, as well as through a refractory liner 47, to allow nozzles 34 to pass into standpipe 101 as suggested in FIG. 5. Flow network 54 is arranged to pass fluid inputs supplied to body block 46 to nozzles 34 as controlled by flow control assembly 48. Refractory liner 47 is abrasion resistant and heat insulating to protect injector module 12 from the reaction process.

Various control mechanisms are included in injector module 12 to control the flow of working fluid into standpipe 101. In the illustrative embodiment, first and second diversion flow blocks 60 and 95 are coupled to opposing portions of body block 46 as suggested in FIG. 3. Each of the first and second diversion flow blocks 60, 95 is similarly configured and each operates in substantially the same manner. As such, only first diversion flow block 60 will be discussed in detail.

First diversion flow block 60 includes upper and lower diversion flow housings 60a and 60b as suggested in FIGS. 3 and 4. Upper diversion flow housing 60a is adapted for diverting oil flow within first diversion flow block 60, while lower diversion flow housing 60b is adapted for diverting steam flow within first diversion flow block 60. Upper diversion flow housing 60a includes an oil inlet 27, with a flange for connecting oil inlet piping, and an oil outlet 29, also with a flange for connecting oil outlet piping. Similarly, lower diversion flow housing 60b includes a steam inlet 93, with a flange for connecting steam inlet piping, and a steam outlet 97, also with a flange for connecting steam outlet piping.

Upper diversion flow housing 60a further includes an oil diversion valve 56 having a cylinder 56a and a cylinder standoff 56b as shown in FIGS. 4 and 5. When oil diversion valve 56 is closed, oil flows from oil inlet 27 to oil outlet 29 and is diverted away from and bypasses standpipe 101. In some embodiments, this bypassed oil is sent to a fractionator for further processing as suggested by arrow 99 in FIGS. 1 and 2. When oil diversion valve 56 is open, oil flows from oil inlet 27 into body block 46 as further detailed below.

Lower diversion flow housing 60b further includes a steam diversion valve 70 incorporating a cylinder 70a and a cylinder standoff 70b as shown in FIGS. 4 and 5. When steam diversion valve 70 is closed, steam flows from steam inlet 93 to steam outlet 97, bypassing standpipe 101. When steam diversion valve 70 is open, steam flows from steam inlet 93 into body block 46. The oil and steam diversion valves 56, 70 are controlled hydraulically by DCCM 14 as described in detail below. During normal operation, the first and second diversion flow blocks 60, 95 allow oil and steam to flow into body block 46, and prevent this flow only in emergencies or to conduct a nozzle replacement operation as further detailed below.

In the illustrative embodiments, flow control assembly 48 includes eight multiflow oil control blocks 78a-78h coupled to an upper portion of body block 46 and circumferentially spaced from one another as suggested in FIG. 3. While eight oil control blocks are shown, more or less blocks may be used depending on the size of the standpipe and number of nozzles being used. Each multiflow oil control block 78a-78h controls the flow of oil, which may be feedstock or resid oil, through flow network 54 within body block 46. In some embodiments, multiflow oil control blocks 78a-78h are each separated into multiple oil control blocks, with each subdivided oil control block associated with a single nozzle 34.

Each multiflow oil control block 78a-78h includes three upper dual block and bleed valves 82a, 82b and 82c as illustrated by multiflow oil control block 78h in FIG. 4. Similarly, each multiflow oil control block 78a-78h includes three intermediate throttling valves 77a, 77b and 77c and three lower dual block and bleed valves 75a, 75b and 75c. The three sets of valves are used to direct the flow of oil to three corresponding nozzles 34. While three sets of valves are shown, more or less sets of valves may be used depending on the number of nozzles being fed by a particular oil control block.

In the illustrative embodiments, flow control assembly 48 also includes eight multiflow steam control blocks 80a-80h coupled to a perimeter portion of body block 46 and circumferentially spaced from one another as suggested in FIG. 3. While eight steam control blocks are shown, more or less blocks may be used depending on the size of the standpipe and number of nozzles being used. Each multiflow steam control block 80a-80h is disposed below a corresponding one of multiflow oil control blocks 78a-78h. For example, multiflow steam control block 80h is disposed below multiflow oil control block 78h as suggested in FIG. 4.

Each multiflow steam control block 80a-80h includes three upper dual block and bleed valves 81a, 81b and 81c as illustrated by multiflow steam control block 80h in FIG. 4. Similarly, each multiflow steam control block 80a-80h includes three intermediate throttling valves 83a, 83b and 83c and three lower dual block and bleed valves 85a, 85b and 85c. The three sets of valves are used to direct the flow of steam to three corresponding nozzles 34. While three sets of valves are shown, more or less sets of valves may be used depending on the number of nozzles being fed by a particular steam control block. In some embodiments, multiflow steam control blocks 80a-80h are each separated into multiple steam control blocks, with each subdivided steam control block associated with a single nozzle 34.

Multiflow oil control blocks 78a-78h and multiflow steam control blocks 80a-80h control the flow of oil and steam, respectively, to nozzles 34. As in the case of the first and second diversion flow blocks 60, 95, control blocks 78a-78h and 80a-80h can be used to prevent the flow of oil and steam to nozzles 34 in the event of needing to replace one of nozzles 34 or in an emergency. The valves of control blocks 78a-78h and 80a-80h are normally open during operation of FCC unit 100 to allow the flow of oil and steam through nozzles 34.

Also included in injector module 12 are a pair of resid oil diversion flow blocks 86 and 94 as shown in FIG. 3. Resid, or residual, oil is waste oil from other processes or is not fully processed FCC oil which is recycled to FCC unit 100 and is typically in the form of heavier oil feeds. These heavier oils can be more difficult to vaporize and atomize because of their high boiling points and high viscosity, even at high operating temperatures. Recycled resid oil can be more responsive to FCC processing because it has been previously activated. Each of first and second resid oil diversion blocks 86, 94 is similarly configured and each operates in substantially the same manner. As such, only first resid oil diversion flow block 86 will be discussed in detail.

First resid oil diversion flow block 86 includes a housing 84 and a resid oil diversion valve 92 coupled to housing 84 as suggested in FIG. 3. Housing 84 includes a resid oil inlet 88, with a flange for connecting oil inlet piping, and a resid oil outlet 90, also with a flange for connecting oil outlet piping. When resid oil diversion valve 92 is closed, oil flows from resid oil inlet 88 to resid oil outlet 90 and is diverted away from and bypasses standpipe 101. In some embodiments, this bypassed resid oil is sent to a fractionator for further processing or to resid oil reservoir as suggested by arrow 99 in FIGS. 1 and 2. When resid oil diversion valve 92 is open, oil flows from resid oil inlet 88 into body block 46 as further detailed below. The resid oil diversion valve 92 is controlled hydraulically by DCCM 14 as described in detail below. During normal operation, the first and second resid oil diversion flow blocks 86, 94 allow oil and steam to flow into body block 46, and prevent this flow only in emergencies or to conduct a nozzle replacement operation as further detailed below.

Flow network 54 is formed in body block 46 for directing the feedstock oil, steam, and resid oil through injector module 12 as suggested in FIG. 6. The various passages, or conduits, are integrally formed within body block 46, which is illustratively in the form of a unitary piece of high strength, corrosion-resistant metal. In some embodiments, body block 46 is formed through a casting process to include flow network 54. In some embodiments, body block 46 is machined from a single piece of material in which the various features, including flow network 54, are shaped by removing portions of the material. In some embodiments, a combination of techniques are used to form body block 46.

Disposed about the outer periphery of body block 46 are a series of protrusions extending radially outward from body block 46 as suggested in FIG. 6. In the illustrative embodiment, these protrusions include oil/steam inlet protrusions 51, 53 disposed on opposing portions of body block 46 from one another, resid oil inlet protrusions 55, 57 disposed on opposing portions of body block 46 from one another and spaced apart from oil/steam inlet protrusions 51, 53, and a plurality of intermediate protrusions 58, 59 positioned between adjacent inlet protrusions 51, 53, 55, 57. Each of oil/steam inlet protrusions 51, 53 is similarly configured and each operates in substantially the same manner. As such, only oil/steam inlet protrusion 51 will be discussed in detail.

Each of resid oil inlet protrusions 55, 57 is similarly configured and each operates in substantially the same manner. As such, only resid oil inlet protrusion 55 will be discussed in detail. Each of intermediate protrusions 58, 59 is similarly configured, and each operates in substantially the same manner, to their opposing counterparts.

In the illustrative embodiment, oil/steam inlet protrusion 51 includes an upper oil inlet 51a and a lower steam inlet 51b as suggested in FIG. 6. Oil inlet 51a and steam inlet 51b extend radially inward into block body 46. A first oil distribution passage 61 is formed through intermediate protrusion 58, shown to the right of oil/steam inlet protrusion 51 in FIG. 6, and toward oil/steam inlet protrusion 51 such that oil inlet 51a is in fluid communication with first oil distribution passage 61. In the illustrative embodiment, the process of forming first oil distribution passage 61 also forms an opening 61d, which can later be closed or used to direct fluid through injection module 12. A second oil distribution passage 62 is formed through intermediate protrusion 59, shown to the left of oil/steam inlet protrusion 51 in FIG. 6, and toward oil/steam inlet protrusion 51 such that oil inlet 51a is in fluid communication with second oil distribution passage 62. In the illustrative embodiment, the process of forming second oil distribution passage 62 also forms an opening 62a, which can later be closed or used to direct fluid through injection module 12.

First and second oil distribution passages 61, 62 are arranged to distribute feedstock oil passed through oil inlet 51a to other areas of block body 46 for subsequent distribution to nozzles 34 as suggested in FIG. 6. The number of oil distribution passages can be increased or decreased depending on the number of nozzles being fed by oil inlet 51a. For example, first and second oil distribution passages 61, 62 are arranged to feed six nozzles. In the illustrative embodiment, a third oil distribution passage 63 is formed in body block 46, and in fluid communication with first and second oil distribution passages 61, 62, to feed an additional three nozzles. Third oil distribution passage 63 is formed through intermediate protrusion 58, shown to the right of oil/steam inlet protrusion 51 in FIG. 6, and toward resid oil inlet protrusion 55. Similar to first and second oil distribution passages 61, 62, any opening created through the formation of third oil distribution passage 63 can later be closed or used to direct fluid through injection module 12. Oil distribution passages 61, 62, 63 together define an oil feed plenum 64. A similar set of oil distribution passages defining another oil feed plenum is associated with oil/steam inlet protrusion 53.

Similar to oil distribution passages 61, 62, 63, steam distribution passages 65, 66, 67, 68 are formed in body block 46 to distribute steam received through steam inlet 51b through injection module 12 as suggested in FIG. 6. A first steam distribution passage 65 is formed through intermediate protrusion 58, shown to the right of oil/steam inlet protrusion 51 in FIG. 6, and toward oil/steam inlet protrusion 51 such that steam inlet 51b is in fluid communication with first steam distribution passage 65. In the illustrative embodiment, the process of forming first steam distribution passage 65 also forms an opening 65d, which can later be closed or used to direct fluid through injection module 12. A second steam distribution passage 66 is formed through intermediate protrusion 58, shown to the right of oil/steam inlet protrusion 51 in FIG. 6, and toward resid oil inlet protrusion 55 such that second steam distribution passage 66 is in fluid communication with first steam distribution passage 65. Third and fourth steam distribution passages 67, 68 are similarly formed through intermediate protrusion 59 between oil/steam inlet protrusion 51 and resid oil inlet protrusion 57. Any opening created through the formation of steam distribution passages 66, 67, 68 can later be closed or used to direct fluid through injection module 12.

Steam distribution passages 65, 66, 67, 68 are in fluid communication with one another to define a steam feed plenum 69 as suggested in FIG. 6. Steam feed plenum 69 is in fluid communication with steam inlet 51b to distribute steam passed through steam inlet 51b to other areas of block body 46 for subsequent distribution to nozzles 34 as further detailed below. A similar set of steam distribution passages defining another steam feed plenum is associated with oil/steam inlet protrusion 53. In some embodiments, the steam feed plenums are in fluid communication with one another.

In the illustrative embodiment, resid oil inlet protrusion 55 includes a resid oil inlet 55a as suggested in FIG. 6. Resid oil inlet 55a extends radially inward into block body 46. A resid oil distribution passage 71 is formed through resid oil inlet protrusion 55 and toward intermediate protrusion 59, shown to the right of resid oil inlet protrusion 55 in FIG. 6, such that resid oil inlet 55a is in fluid communication with resid oil distribution passage 71. In the illustrative embodiment, the process of forming resid oil distribution passage 71 also forms an opening 71a, which can later be closed or used to direct fluid through injection module 12. Resid oil distribution passage 71 is arranged to distribute resid oil passed through resid oil inlet 55a to other areas of block body 46 for subsequent distribution to nozzles 34. The number of resid oil distribution passages can be increased or decreased depending on the number of nozzles being fed by resid oil inlet 55a. For example, resid oil distribution passage 71 is arranged to feed three nozzles. A similar resid oil distribution passage is associated with resid oil inlet protrusion 57.

A plurality of mixing chambers are formed radially inward into body block 46 between each of protrusions 51, 53, 55, 57, 58, 59 as illustrated by mixing chambers 72a, 72b, 72c in FIG. 6. In the illustrative embodiment, each mixing chamber formed in body block 46 is substantially identical, and any discussion of mixing chambers 72a, 72b, 72c applies to the remaining mixing chambers. Each mixing chamber 72a, 72b, 72c is arranged to receive a feed of steam and feedstock oil, or resid oil as the case may be, to form the working fluid which is directed through a nozzle-inlet tube 74a, 74b, 74c associated with mixing chambers 72a, 72b, 72c, respectively, toward nozzles 34. There is an individual mixing chamber associated with each nozzle 34 such that the flow of working fluid can be shut off for one nozzle 34 without affecting the flow to adjacent nozzles 34. For example, shut-off valve receivers 79a, 79b, 79c are formed through an upper portion of body block 46 to intersect nozzle-inlet tubes 74a, 74b, 74c, respectively, and arranged to receive shut-off valves 98a, 98b, 98c for blocking or allowing the working fluid flowing through mixing chambers 72a, 72b, 72c to flow toward nozzles 34 as suggested in FIGS. 1, 4, and 5.

Each steam distribution passage 65, 66, 67, 68 has associated steam outlets formed radially into body block 46 as illustrated by steam outlets 65a, 65b, 65c of steam distribution passage 66 in FIG. 6. In the illustrative embodiment, each steam outlet formed in body block 46 is substantially identical, and any discussion of steam outlets 65a, 65b, 65c applies to the remaining steam outlets. Steam flowing through steam outlets 65a, 65b, 65c is directed into one of the multiflow steam control blocks 80a-80h, such as multiflow steam control block 80a shown in FIGS. 4 and 5, which controls the flow of steam and directs the flow of steam toward mixing chambers 72a, 72b, 72c as discussed further below.

Each oil distribution passage 61, 62, 63 has associated oil outlets formed through an upper portion into body block 46 as illustrated by oil outlets 61a, 61b, 61c of third oil distribution passage 63 in FIG. 6. In the illustrative embodiment, each oil outlet formed in body block 46 is substantially identical, and any discussion of oil outlets 61a, 61b, 61c applies to the remaining oil outlets. Similarly, resid oil distribution passage 71 has associated resid oil outlets which are substantially identical to oil outlets 61a, 61b, 61c. Feedstock oil, or resid oil as the case may be, flowing through oil outlets 61a, 61b, 61c is directed into one of the multiflow oil control blocks 78a-78h, such as multiflow oil control block 78a shown in FIGS. 4 and 5, which controls the flow of oil and directs the flow of oil toward mixing-chamber inputs 76a, 76b, 76c associated with mixing chambers 72a, 72b, 72c, respectively, as discussed further below.

Discussion of how oil and steam flow through injector module 12 will now be made with respect to multiflow control blocks 78b and 80b, and particularly with respect to flow through a nozzle 34c, as illustrated in FIG. 5 and suggested in FIGS. 4 and 6. This discussion should apply with equal force to the remaining multiflow control blocks 78b-78h and 80b-80h and the remaining nozzles 34. The fluid inputs flow inwardly toward central tube 52 to be released into standpipe 101.

Feedstock oil enters diversion flow block 60 through oil inlet 27 and is directed toward body block 46 as suggested in FIG. 5. The feedstock oil enters through upper oil inlet 51a and fills first distribution passage 61. The feedstock oil travels upward through oil outlet 61a toward oil control block 78b. Dual block and bleed valves 75c and 82c are open to allow the feedstock oil to flow through oil control block 78b while throttling valve 77c controls the rate of flow. In some embodiments, throttling valve 77c provides an additional shut-off to the flow of oil. The feedstock oil passes into mixing-chamber input 76c toward mixing chamber 72c. As feedstock oil enters mixing chamber 72c, it strikes an atomizer plug 91c which assists in atomizing the feedstock oil for mixing with the steam.

Substantially simultaneously, steam enters diversion flow block 60 through steam inlet 93 and is directed toward body block 46 as suggested in FIG. 5. The steam enters through lower steam inlet 51b and fills steam distribution passage 65. The steam travels radially outward through steam outlet 65a toward steam control block 80b. Dual block and bleed valves 85c and 81c are open to allow the steam to flow through steam control block 80b while throttling valve 83c controls the rate of flow. In some embodiments, throttling valve 83c provides an additional shut-off to the flow of steam. The steam then passes into mixing chamber 72c. As the steam enters mixing chamber 72c, it further atomizes and mixes with the feedstock oil to form the working fluid and force the working fluid toward nozzle-inlet tube 74c.

The mixed feedstock oil and steam travels from mixing chamber 72c toward shut-off valve receiver 79c through nozzle-inlet tube 74c as suggested in FIG. 5. Nozzle 34c, similar to the other nozzles 34, is received in a nozzle seat 89c and held in body block 46 by a nozzle cap 45c. The working fluid passes through shut-off valve receiver 79c into nozzle 34c and is injected into central tube 52 to react with the catalyst traveling through standpipe 101. The fluid flow described above is substantially similar when resid oil is used.

It can be advantageous to replace a damaged or clogged nozzle 34 while FCC unit 100 is still in operation to minimize the operational downtime and maximize efficiency. For example, in the illustrative embodiment, a nozzle-removal tool 96 is attached to nozzle 34c as shown in FIG. 5. Dual block and bleed valves 75c, 82c are closed, as further detailed below, to block the flow of oil to nozzle 34c. Nozzle 34c can then be retracted into nozzle-removal tool 96 to pass out of nozzle seat 89c. In some embodiments, steam still flows toward nozzle seat 89c to inhibit the influx of catalyst and reactive material flowing through central tube 52 into flow network 54. Shut-off valve 98c is then closed to physically block such an influx. Dual block and bleed valves 75c, 82c are then closed to block the flow of steam and dissipate residual pressure. Nozzle-removal tool 96 can then be removed and fitted with a replacement nozzle 34c for re-insertion into nozzle seat 89c using a reverse process of that described above. In some embodiments, shut-off valve 98c is configured to engage with nozzle 34c to block the flow of oil and steam therethrough.

Referring to FIG. 7, there is shown a longitudinal sectional view of one of nozzles 34. Nozzle 34 includes a distal portion 204a and a proximal portion 204b. The distal and proximal portions 204a, 204b of nozzle 34 are connected together, but are separated by means of a cylindrical slot 206 extending through the nozzle 34. Distal portion 204a of nozzle 34 includes an elongated inner slot 203 extending between an inlet 207 and an outlet 202 thereof and through which the oil and steam mixture is directed into the standpipe 101. Inlet 207 is in fluid communication with cylindrical slot 206. A tip 201 of nozzle 34 is angled. Proximal portion 204b is formed to include a threaded end 208 which also has a set of internal threads 209. In some embodiments, threaded end 208 engages with a nozzle cap to hold nozzle 34 in place in injector module 12.

Another embodiment of a nozzle 334 for use in injector module 12 is shown in FIG. 7A. Nozzle 334 includes a distal portion 304a and a proximal portion 304b. The distal and proximal portions 304a, 304b of nozzle 334 are connected together, but are separated by means of a cylindrical slot 306 extending through the nozzle 334. Distal portion 304a of nozzle 334 includes an elongated inner slot 303 extending between an inlet 307 and an outlet 302 thereof and through which the oil and steam mixture is directed into the standpipe 101. Inlet 307 is in fluid communication with cylindrical slot 306. A tip 301 of nozzle 34 is substantially hemispherical. Proximal portion 304b is formed to include a threaded end 308 which also has a set of internal threads 309. In some embodiments, threaded end 308 engages with a nozzle cap to hold nozzle 334 in place in injector module 12.

Figure 8:
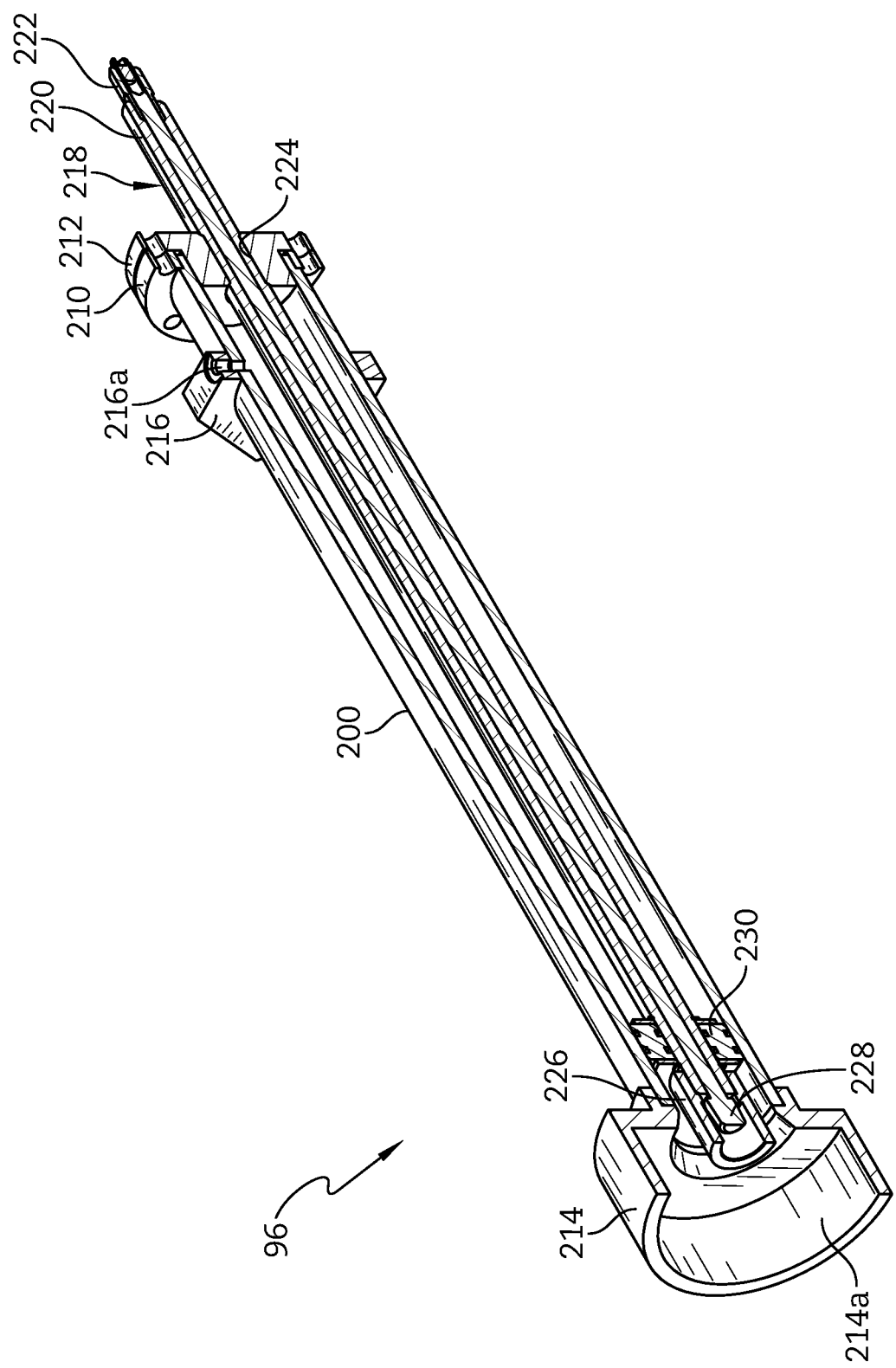
FIG. 8 is a longitudinal sectional view of a nozzle-removal tool for use in installing or replacing a nozzle in injector module.

Referring to FIG. 8, there is shown a longitudinal sectional view of nozzle-removal tool 96 for use in removing and replacing nozzles 34 or 334. Nozzle-removal tool 96 includes an elongated cylindrical tube 200 having an inner end flange 210 and an outer end cap 212 disposed in abutting contact with inner end flange 210. Disposed on a second, opposed end of elongated cylindrical tube 200 from inner end flange 210 is an enlarged cylindrical housing 214. In the illustrative embodiment enlarged cylindrical housing 214 and inner end flange 210 are formed integrally with elongated cylindrical tube 200. An inner portion 214a of enlarged cylindrical housing 214 is arranged to surround and engage with the nozzle cap of the nozzle being replaced. In some embodiments, inner portion 214a is formed to include threads for coupling to the nozzle caps.

Nozzle-removal tool 96 further includes a hexagonal flange 216 having a bleeder port 216a for displacing the contents of cylindrical tube 200 as the nozzle is being retracted as suggested in FIG. 8. Hexagonal flange 216 is fixedly attached to cylindrical tube 200 and allows for rotational displacement of nozzle-removal tool 96 and the nozzle cap to which it is connected to facilitate nozzle removal and replacement. Disposed within elongated cylindrical tube 200 is an inner shaft 218 having threads 220 disposed on its outer surface and extending substantially the length thereof. Inner shaft 218 is securely connected to elongated cylindrical tube 200 by the engagement of outer threads 220 with inner threads 224 on inner portions of end flange 210 and end cap 212. Rotation of inner shaft 218 allows it to be further inserted within elongated cylindrical tube 200 or to be withdrawn from cylindrical tube 200.

Inner shaft 218 includes a coupler having an inner threaded portion 228 and an outer threaded portion 226 for engaging the end 208 of nozzles 34 as suggested in FIG. 8. Inner threaded portion 228 is rotatable relative to outer threaded portion by engaging an exposed end 222. A seal block 230 is coupled to inner shaft 218 to move therewith and block fluid from passing through nozzle-removal tool 96. In some embodiments, nozzle-removal tool 96 is formed from a high strength, corrosion resistant metal.

Figure 9:
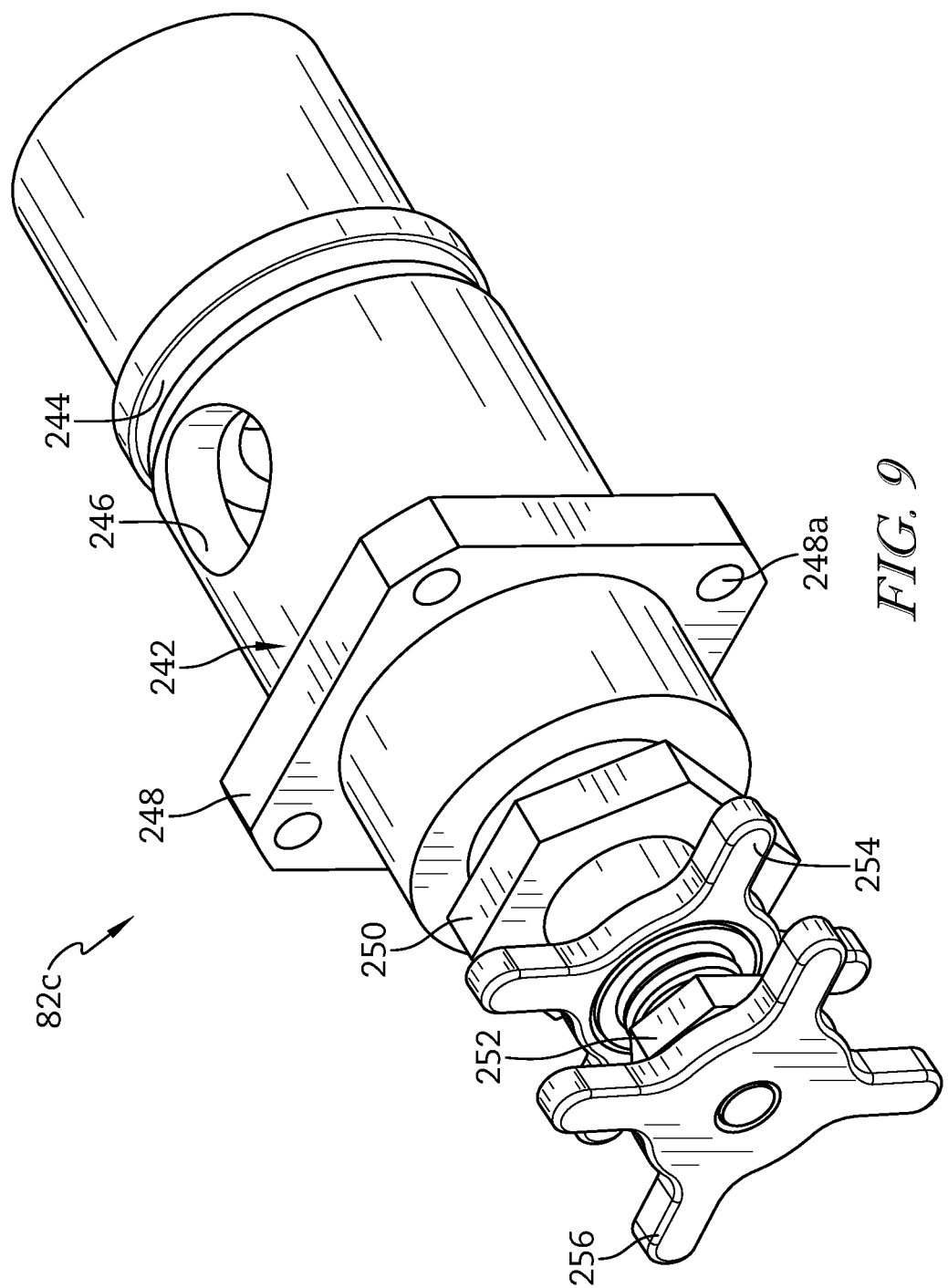
FIG. 9 is a perspective view of a dual block and bleed valve for use in controlling the oil and steam flow within the injector module.
Figure 10:
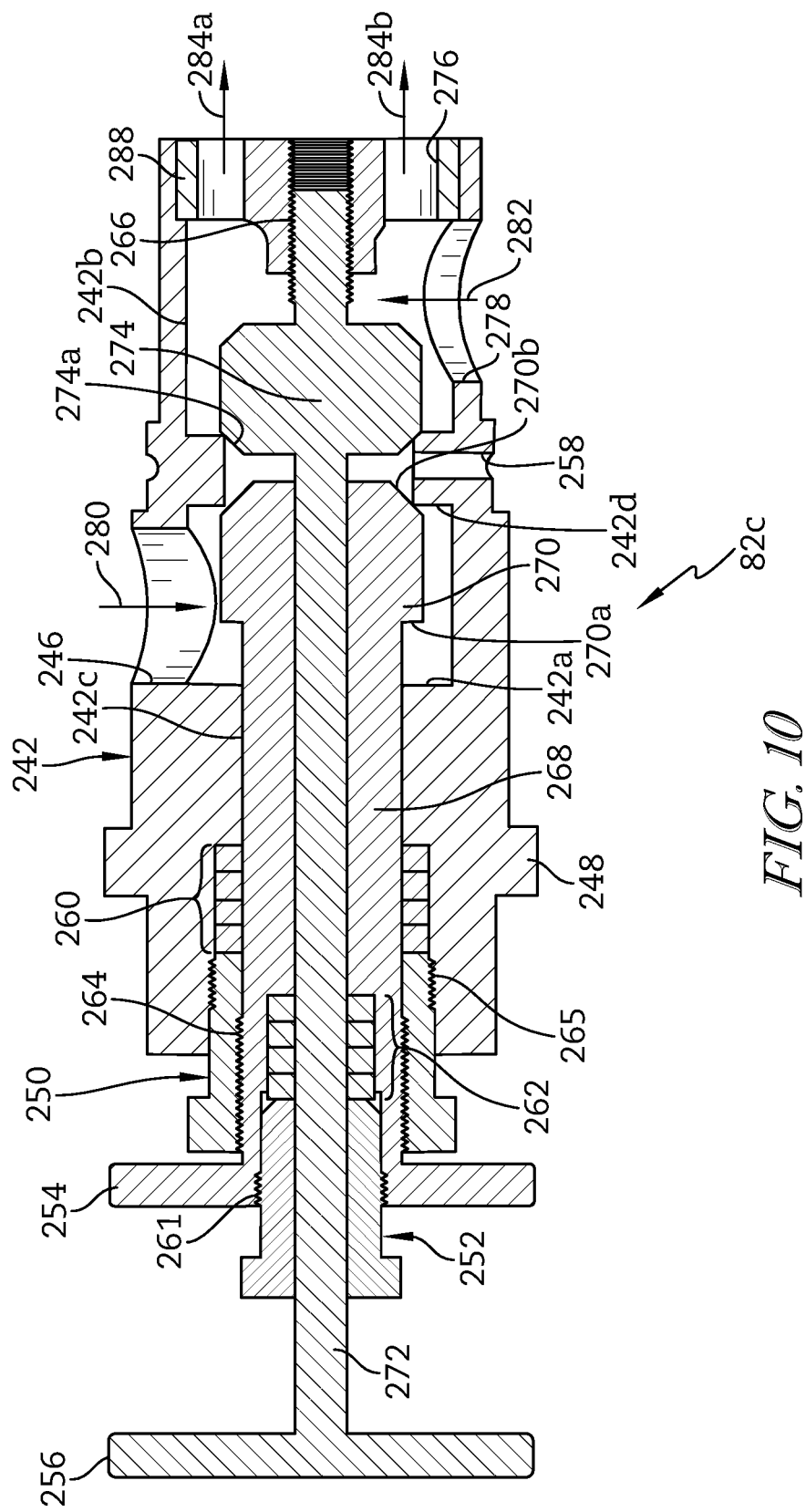
FIG. 10 is a longitudinal sectional views of the dual block and bleed valve of FIG. 9.
Figure 11:
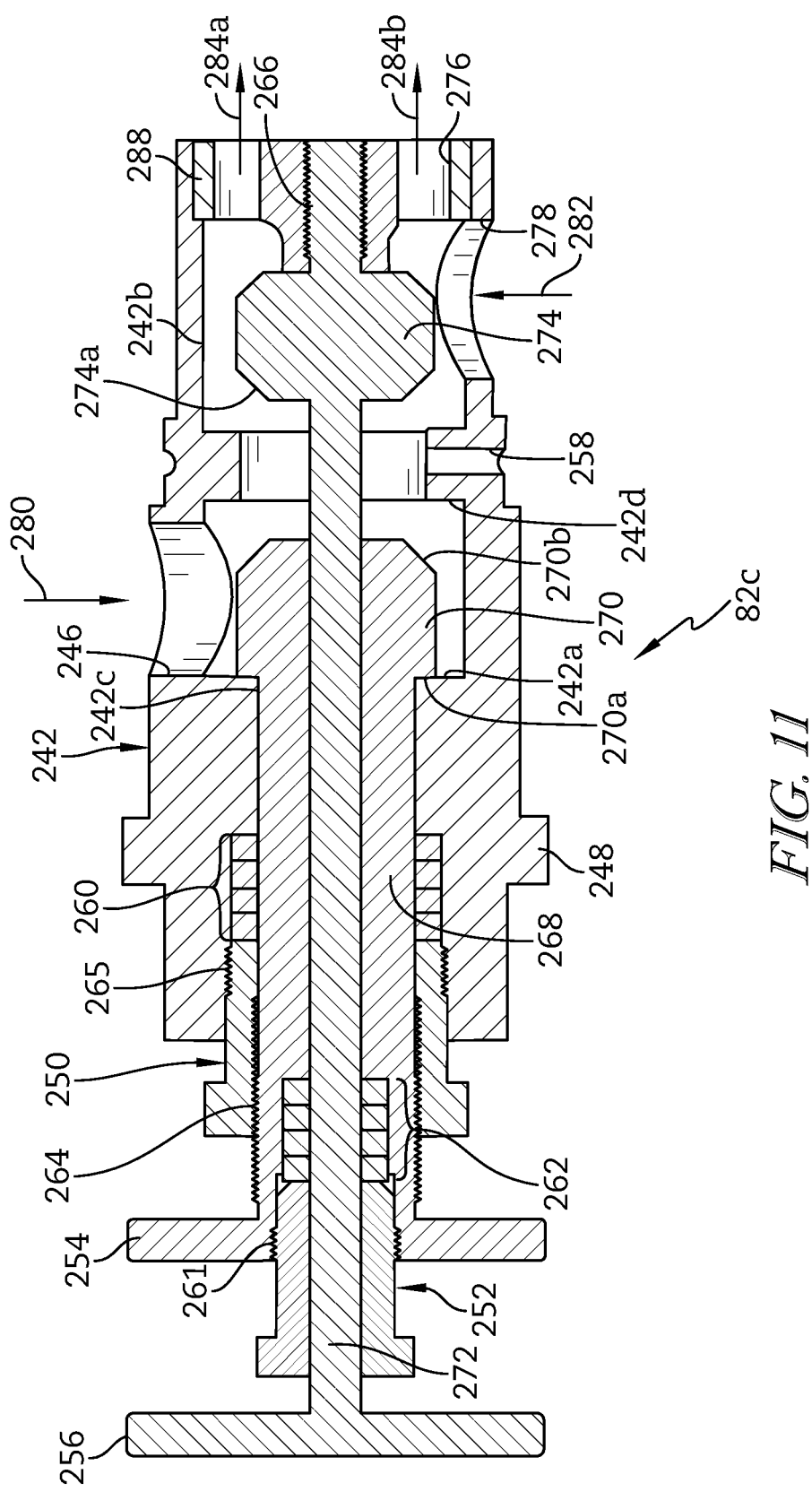
FIG. 11 is a view similar to FIG. 10.
Figure 12A:
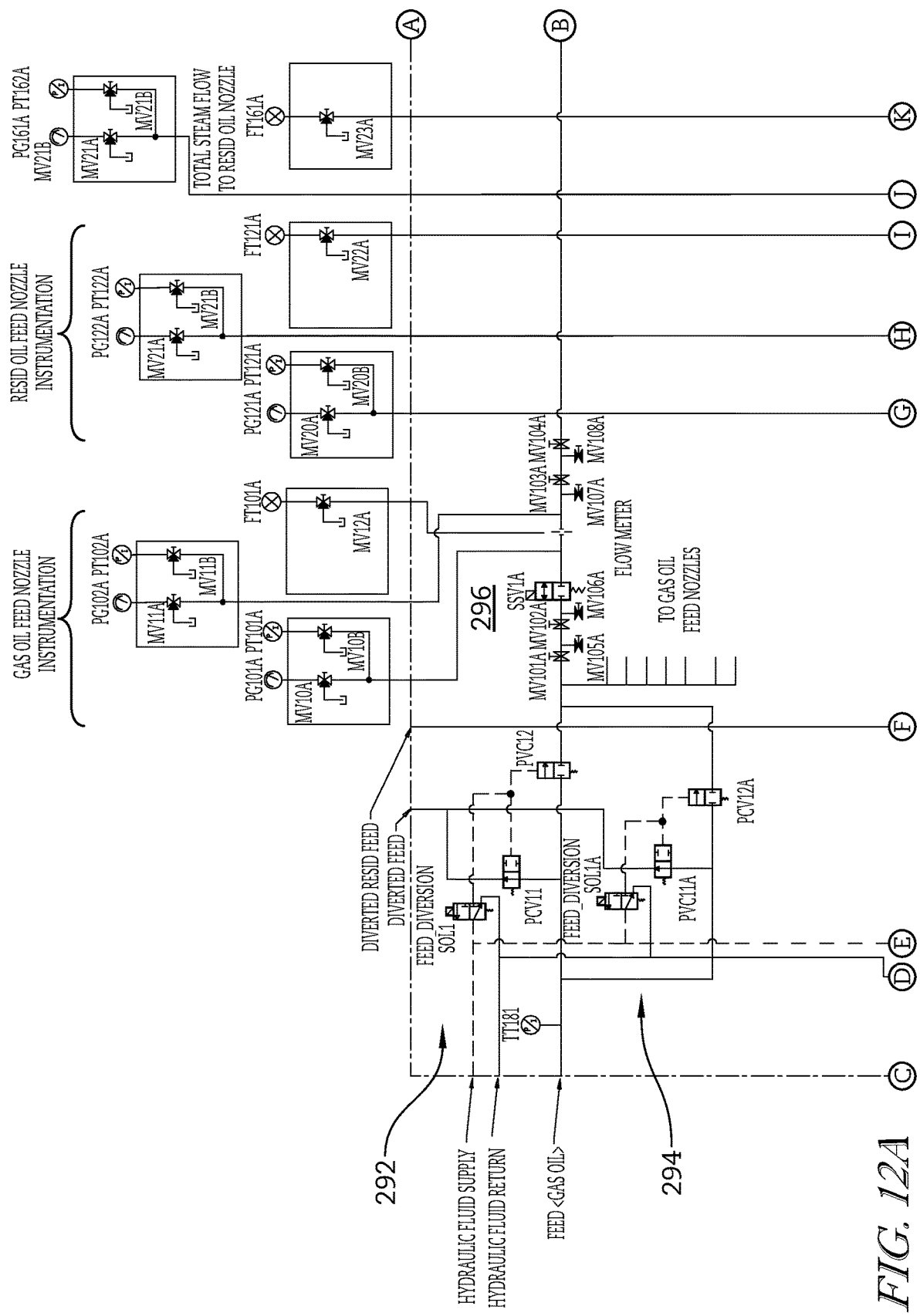
FIGS. 12A-12D illustrate a schematic view diagram of various controls and monitors of the data collection and control module monitoring and controlling the operation of the injector module.
Figure 12B:
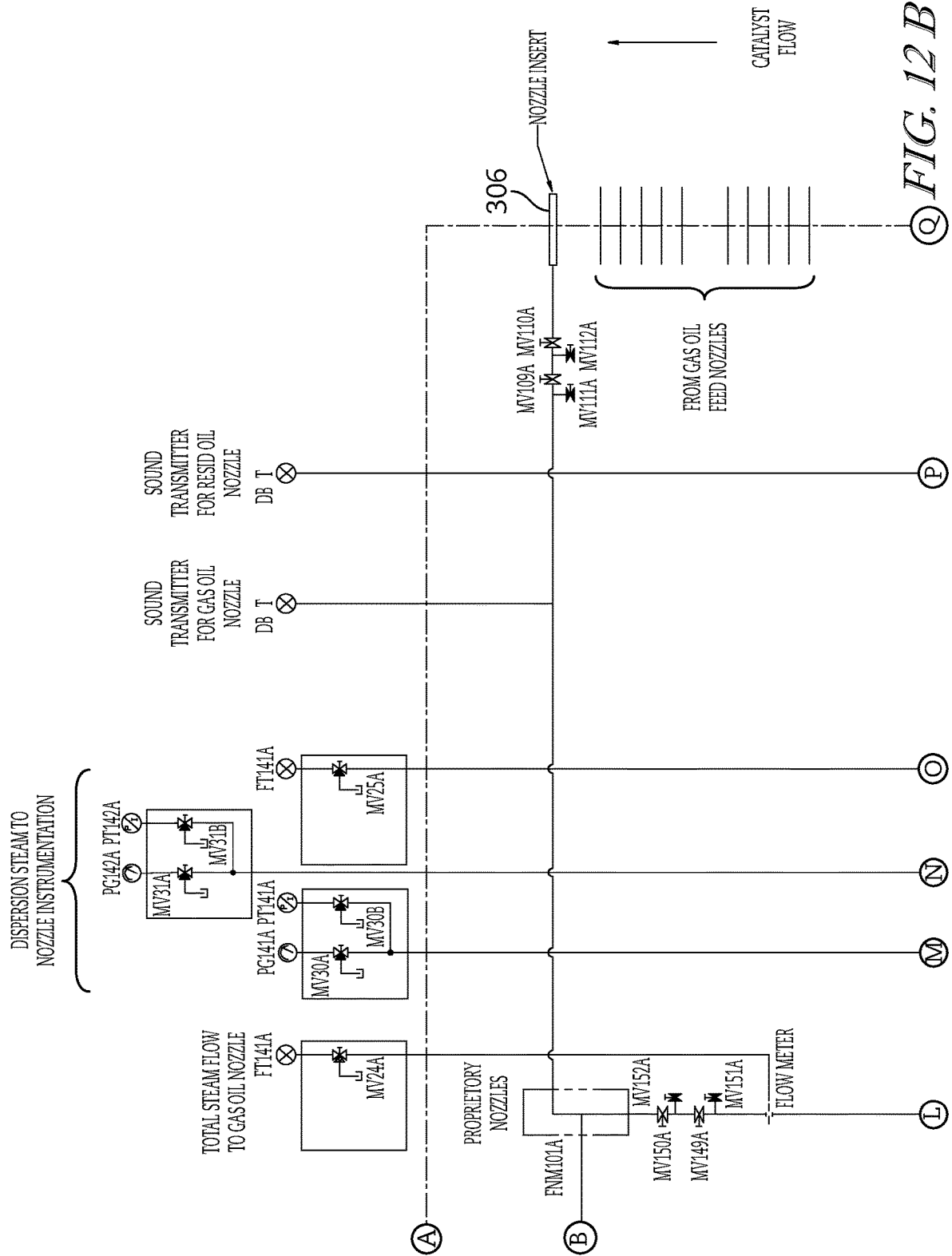
Figure 12C:
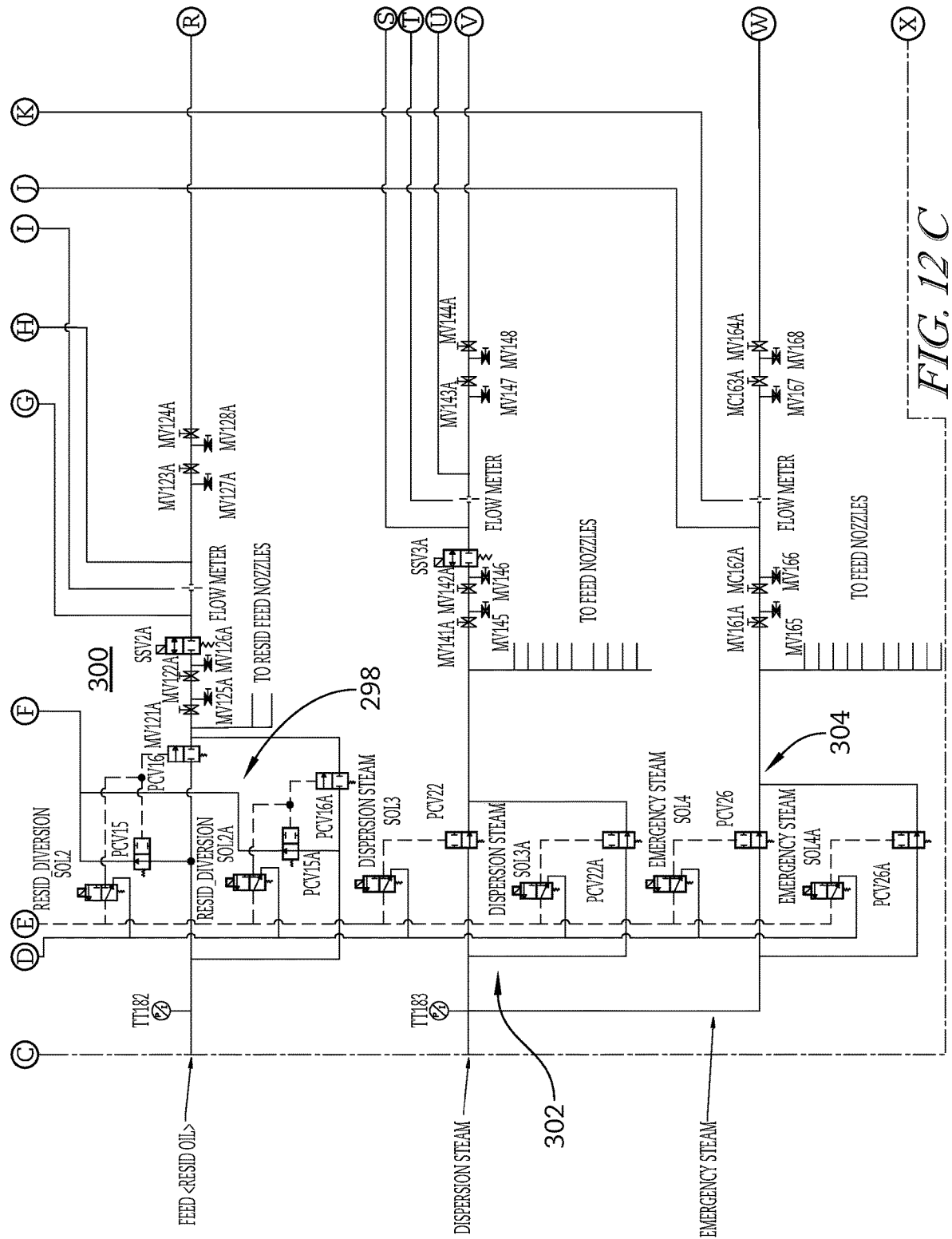
Figure 12D:
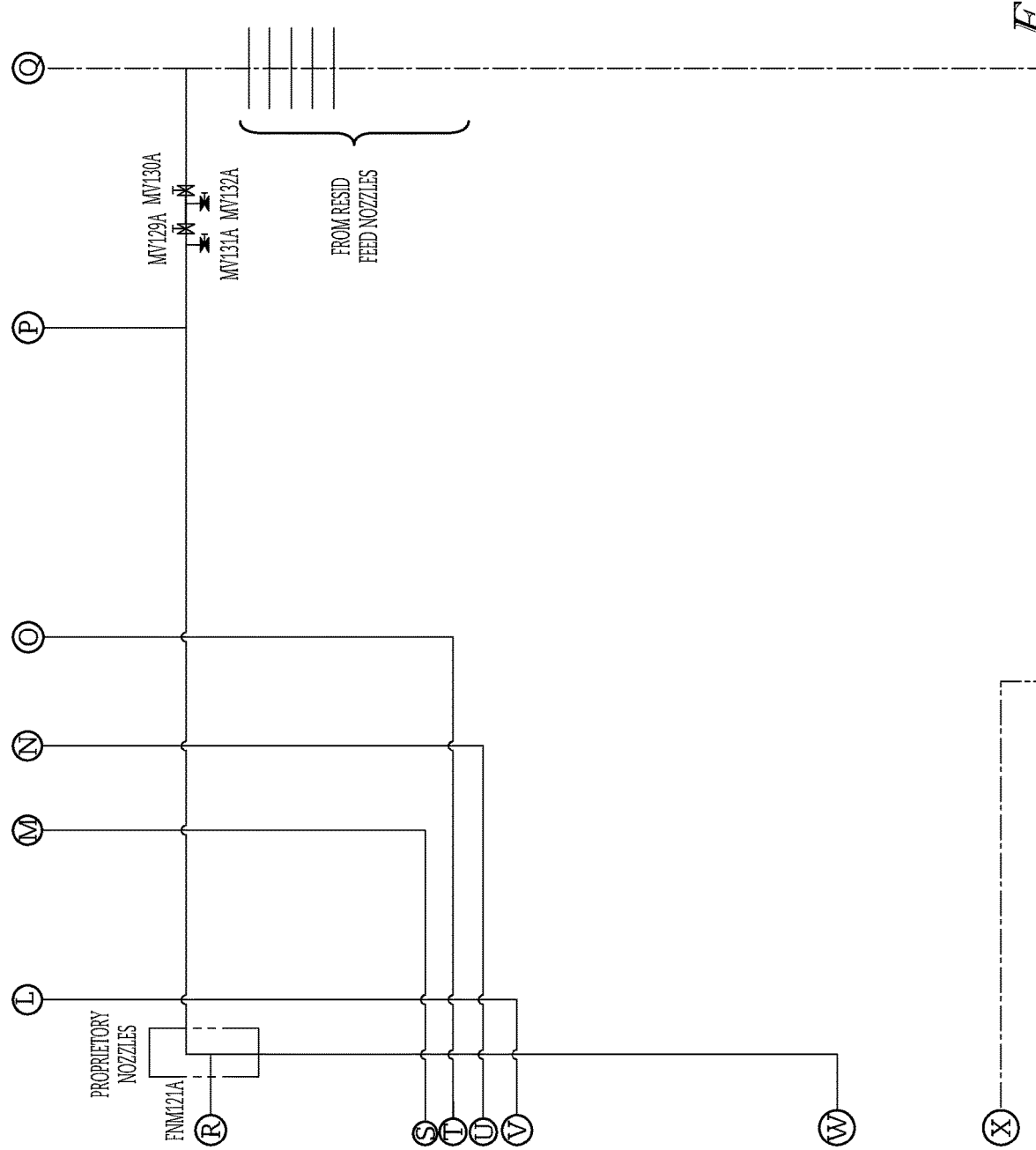

Referring to FIG. 9, there is shown a perspective view of dual block and bleed valve 82c used in controlling the flow of oil through injector module 12. All of the dual block and bleed valves are substantially similar in construction, and only a detailed discussion of dual block and bleed valve 82c will be made. Valve 82c includes a cylindrical hollow housing 242, an inner stem 272, and an outer stem 268 as shown in FIGS. 10 and 11. A mounting flange 248 is formed on housing 242 and has apertures 248a adapted to receive fasteners (not shown) for mounting valve 82c to a supporting structure.

Dual block and bleed valve 82c includes a number of ports 246, 276, 278 for passing fluid through valve 82c as suggested in FIGS. 10 and 11. The ports 246, 276, 278 can be arranged to act as an input or an outlet depending on the surrounding structure to which valve 82c is fitted. For example, in the illustrative embodiment, port 278 may be covered such that port 246 acts as an inlet as suggested by arrow 280. Fluid then flows through dual block bleed valve 82c and passes out of port 276, acting as an outlet, as suggested by arrows 284a, 284b. Port 278 may also act as an inlet as suggested by arrow 282. In some embodiments, the flow is reversed and fluid passes into valve 82c through port 276 and out of one or both of ports 246, 278. In some embodiments, valve 82c acts as a mixing chamber where oil enters through port 278 while steam enters through port 246, and the mixed fluid exits through port 276.

Outer and inner stems 268, 272 are positioned within housing 242 and arranged to move relative thereto between a fully closed position, shown in FIG. 10, and a fully open position, as shown in FIG. 11. In some embodiments, stems 268, 272 pass through an open end 242b of housing 242 and slide into a bore 242c until a shoulder 270 of a plug end 270 of outer stem 268 engages with a shoulder 242a of housing 242.

An outer retainer collar 250 surrounds stems 268, 272 and engages with housing 242 through a threaded connection 265 as suggested in FIGS. 10 and 11. Collar 250 engages with graphite packing seals, or gland packing, 260 to seal against housing 242 and outer stem 268. A threaded connection 264 allows outer stem 268 to move relative to outer collar 250 and housing 242. In some embodiments, a handle 254 is coupled to stem 268 after stems 268, 272 are inserted and collar 250 is coupled to housing 242.

An inner retainer collar 252 surrounds inner stem 272 and engages with outer stem 268 through a threaded connection 261 as suggested in FIGS. 10 and 11. Collar 252 engages with graphite packing seals, or gland packing, 262 to seal against outer stem 268 and inner stem 272. A threaded connection 266 with an insert 288 coupled to housing 242 allows inner stem 272 to move relative to outer stem 268 and housing 242. In some embodiments, a handle 256 is coupled to stem 272 after stems 268, 272 are inserted and collar 252 is coupled to housing 242.

Stems 268, 272 are movable relative to each other as detailed above and as suggested in FIGS. 10 and 11. Plug end 270 of outer stem 268 moves toward or away from a seat 242d depending on the rotation of handle 254. A tapered portion 270b engages with seat 242d to block a flow of fluid from passing seat 242d when in the closed position shown in FIG. 10. The flow of fluid is instead directed to a bleeder port 258. Similarly, a plug end 274 of inner stem 272 moves toward or away from seat 242d depending on the rotation of handle 256. A tapered portion 274a engages with seat 242d to block a flow of fluid from passing seat 242d when in the closed position shown in FIG. 10. The flow of fluid is instead directed to a bleeder port 258.

As such, the various flows through valve 82c can be blocked and bled in multiple directions and orientations. For example, in the illustrative embodiment of FIG. 5, valve 82c is positioned in oil control block 78b such that port 278 is blocked while port 246 acts as an inlet and port 276 acts as an outlet. During normal operation, valve 82c is in the open position with both plug ends 270, 274 unseated.

Moving plug end 270 to a closed position will block the flow of oil coming from first oil distribution passage 61 and through oil control block 78b and port 246 from flowing out of port 276. A back pressure within mixing chamber 72c would be allowed to bleed out through bleeder port 258 until plug end 274 is moved to the closed position. The opposite would also be true if plug end 274 were seated first, where back pressure in mixing chamber 72c would be blocked and the flow of oil could bleed. In some embodiments, a pressure gauge can be attached to bleeder port 258 to detect residual pressures during operation of valve 82c. The disclosed block and bleed valve 82c thus provides a simple, single device for the detection and release of excess residual pressure, thereby enhancing reliability and safety.

Basic Description of Operation

One embodiment of a flow diagram and flow control arrangement will now be described in relation to FIGS. 12A-12D, which when laid out such that the lettered lines are aligned shows a complete diagram. The assembly detailed above can be arranged to handle more than two feedstock supplies, but for this description, we will use two feedstock oils—a feedstock oil and a resid oil. These two oils are separately supplied to the injector module at a pressure between about 50 psig and 300 psig, and are preheated to approximately 500° F. Steam is also supplied to the injector module at pressures between about 50 psig and 350 psig and at temperatures between saturated steam for the pressures and about 550° F. which has some superheat in the steam. As a result, the injector module is operating at a temperature of approximately 450 to 500° F. over its surfaces and throughout the supplied material. Steam is supplied typically at two different points on the injector module to reduce piping connected to the injector module. Condensate can occur in the injector module when the unit is not operating or even during certain reduced operation, so systems can be included for controlling steam condensate.

Feedstock Oil Control and Injection

The injector module controls the flow of feedstock and resid oils in the following manner as directed by DCCM 14. Hydraulic oil is supplied at pressure to the injector module to control the position of the controlling and safety valves which operate the injector module. Specifically, hydraulic solenoid valve SOL1 is a normally closed solenoid valve that when de-energized removes the piloting pressure off of two logic valves PCV11 and PCV12. This solenoid valve, when energized, provides piloting hydraulic fluid pressure to the activating port on the logic valves PCV11 and PCV12, thus causing the valves to open. These logic valves are therefore a digital valve—meaning they are either open or closed, and are simple and reliable two position, two port valves. The solenoid valve SOL1 is a three port, two position valve. The failsafe nature of how this circuit is arranged provides the supply feedstock oil to the injector module a path into the rest of the circuit when SOL1 is energized, but if there is a power failure or an emergency function or a fire, power is removed from SOL1 and the feedstock oil is diverted to another selected direction and location that is safe. This same circuit is duplicated with SOL1A and PCV11A and PCV12A for redundancy of control functions. This duplication is provided as most applications require absolute reliability, so a redundant system does assure this functionality. If redundancy is not desired by the end user, the second circuit is easily not installed as each of these circuits is built into a function block assembly which can be bolted on or removed simply by unbolting and using a cover plate for that particular location.

PCV11 or PCV11A is located in the feedstock gas oil line. The PCV12 or PCV12A valves provide a flowpath to a diversion point usually a location where the oil can be recycled eventually back to the process, but is not provided to the standpipe assembly for safety. This function is provided to maintain safe operation in the case of emergency conditions. This feed diversion module 294 can be arranged also to be in series instead of in parallel function for additional safety if the end user so desires.

As the feedstock oil passes the feed diversion module 294, it enters into a first control module 296 which is an assembly for controlling valves and isolation valves. The control module 296 includes a servo control modulating valve SSV1A which is able to be isolated with double block valves MV101A, MV102A, MV103A and MV104A on the upstream and downstream positions. These isolation valves MV101A, MV102A, MV103A, and MV104A maintain the current state of and provide proper isolation with the bleed valves to atmosphere MV105A, MV106A, MV107A, MV108A valves. These latter valves are designated for each individual injection point with letters A, B, C, etc. for each of the above valves. The SSV1A valve can be electrically operated as a servo solenoid or proportional type valve or is supplied as a hydraulically controlled servo modulating control valve. Within the block valves described above and associated with the servo control modulating valve SSV1A are the following components:

flow meter transmitter FT101A;
pressure transmitter PT101A; and
pressure gauge PG101A.

The above components are located downstream of servo control modulating valve SSV1A and upstream of flow transmitter FT101A. A pressure transmitter PT102A and a pressure gauge PG102A are located downstream of flow transmitter FT101A. The above items can all be isolated at the same time as the servo solenoid valve SSV1A with the manual valves MV101A, MV102A, MV103A, and MV104A. This provides maintenance capability for changing any of the components in this group during operation. Therefore, servo control modulating valve SSV1A, pressure transmitter PT101A, pressure gauge PG101A, flow meter transmitter FT101A, pressure transmitter PT102A, and pressure gauge PG102A can all be individually removed and replaced during operation of the DCCM safely and in a provable safe manner.

The purpose of first control module 296 is to control the feedstock fluid flow to the feed injection nozzle for that particular control circuit. Flow is measured for each individual injection nozzle circuit, with pressures upstream and downstream of the flow transmitter provided so a data comparison can be made between the upstream and downstream pressures of the flow transmitter FT101A, which comparisons can be correlated to flow at different pressures supplied and at different flow rates. Further, control valve SSV1A can be used to adjust the flow of feedstock so that adjustment of the entire number of nozzles can be made while online to provide optimum flow for different feedstock materials and pressures, temperatures, and types.

From the first control module 296, the feedstock oil flows to injector assembly FNM101A. This can be an injection nozzle, such as nozzle 34 or 334, that the end user wants to use. The user may select other nozzles as well which fit the injector module. In this configuration, the feed injection nozzle module FNM101A mixes and breaks down the feedstock oil with steam or other product. The injection module is designed to be removed and replaced as a bolt-on assembly and permits easy design changes to the nozzle assembly.

The feedstock injection nozzle module FNM101A is isolated on the upstream side by the double block and bleed valves MV103A and MV104A, MV107A, MV108A and is isolated and bled on the downstream side of the feed injection nozzle module FNM101A by block valves MV109A and MV110A and bleed valves MV111A and MV112A. Feedstock injection nozzle module FNM101A can, therefore, be isolated during operation of the DCCM and removed and replaced, if necessary. This is a unique feature of the assembly.

The feedstock oil is broken down inside the injection nozzle module FNM101A with steam and the mixed materials are carried to the catalyst in the riser section, or equivalent section in other processes, through the injector module to an inserted nozzle. Through this pathway inside the injector module to the inserted nozzle, the same profile of the passageway as required by the individual assemblies in different systems is maintained. The nozzle insert protrudes through the piping wall and in some cases refractory or other liner materials. In some embodiments, this nozzle insert is made from solid stellite to provide resistance to wear from the severe erosion that can take place in these types of systems. The nozzle insert can also be removed from the piping and liner assembly during operation of the injector module in a safe manner. A hydraulic extractor designed especially for this function is used to maintain a nozzle insert if it wears. The nozzle inserts can be pulled back through a packing by the hydraulic extractor and then the process function of the catalyst can be isolated using blocking valves MV109A and MV110A. A determination that these valves are holding properly can be made via bleed valves MV111A and MV112A as they are open to atmosphere to verify that the MV109A and MV110A valves are holding properly when isolated. Steam purge through these valves when closing is maintained to prevent catalyst from entering into the valve assemblies MV109A, MV110A, MV111A, or MV112A.

Resid Oil Control and Injection

The injector module controls the resid oil in the following manner. Hydraulic oil is supplied under pressure to injector module to control the position of the controlling and safety valves which operate the injector module. Specifically, hydraulic solenoid valve SOL2 is a normally closed solenoid valve that when de-energized removes the piloting pressure off of two logic valves PCV15 and PCV16. This solenoid valve SOL2 when energized provides piloting hydraulic fluid under pressure to the activating ports of logic valves PCV15 and PCV16, thus causing the valves to open. These logic valves are therefore a digital valve—meaning they are either open or closed, and are simple and reliable two position two port valves. The solenoid valve SOL2 is a three port, two position valve. The failsafe nature of how this circuit arrangement provides the supply resid oil to the injector module is a path to the rest of the circuit when SOL2 is energized, but if there is a power failure or an emergency function or a fire, power is removed from SOL2 and the resid oil is diverted to another selected direction and location that is safe. This same circuit is duplicated with SOL2A and PCV15A and PCV16A for redundancy of this control function. This duplication is provided as most applications require absolute reliability, so a redundant system assures this functionality that is generally required. If redundancy is not desired by the end user, the second circuit is easily not installed as each of these circuits is built into a function block assembly which can be bolted on or removed simply by unbolting and using a cover plate for that particular location.

PCV15 or PCV15A is located in the resid gas oil line and blocks the flow of fluid to the injector module. PCV16 or PCV16A valves provide a flowpath to a diversion point which is typically a location where the oil can be recycled eventually back to the process, but is not provided to the riser assembly for safety. This function is provided to maintain safe operation in the case of emergency conditions. The feed diversion module 298 can be arranged also to be in series instead of in parallel function for additional safety if the end user so desires.

As the resid oil passes the feed diversion module 298, it enters into a second control module 300 which is an assembly where controlling valves and isolation valves are located. This assembly consists of a servo control modulating valve SSV2A which is able to be isolated with double block valves MV121A, MV122A, MV123A and MV124A on the upstream and downstream positions. These isolation valves MV121A, MV122A, MV123A, and MV124A maintain the state of and provide proper isolation with atmospheric bleed valves MV125A, MV126A, MV127A, MV128A valves. These latter valves are designated for each individual injection point with letters A, B, C etc. for each of the above valves. The SSV1A valve can be electrically operated as a servo solenoid or proportional type valve or is supplied as a hydraulically controlled servo modulating control valve. Within the block valves described above and associated with the servo control modulating valve SSV2A are the following components:

flow meter transmitter FT121A;
pressure transmitter PT121A; and
pressure gauge PG121A.

The above components are located downstream of SSV2A and upstream of flow transmitter FT121A. The following two components are located downstream of flow transmitter FT121A:

pressure transmitter PT122A; and
pressure gauge PG122A.

The above items can all be isolated at the same time by means of servo solenoid valve SSV2A, with manual valves MV121A, MV122A, MV123A, and MV124A. This provides a maintenance capability for changing any of the components in this group during operation. Therefore, the SSV2A, PT121A, PG121A, FT121A, PT122A, PG122A can all be individually removed and replaced during operation of the DCCM safely and in a provable safe manner.

The purpose of the second control module 300 is to control the resid fluid flow to the feed injection nozzle for that particular control circuit. Flow is measured for each individual injection nozzle circuit, and pressures upstream by pressure transmitter PT121A, pressure gauge PG121A and downstream by PT122A, PG122A of flow transmitter FT121A are provided so data comparison can be made between the upstream and downstream pressures of flow transmitter FT121A and can be correlated to flow at different pressures supplied and at different flowrates. Further, control valve SSV2A can be used to adjust the flow of resid so that adjustment of the entire number of nozzles can be made while online to find the optimum flow for different resid materials and pressures, temperatures, and types.

From the second control module 300, resid oil flows to resid injection nozzle module FNM121A. This can be an injection nozzle, such as nozzle 34 or 334, that the end user wants to use. The user may select other nozzles as well which fit the injector module. In this configuration, feed injection nozzle module FNM121A mixes and breaks down the resid oil with steam or other product. This module is designed to be removed and replaced as a bolt-on assembly and permits easy design changes to the nozzle assembly.

Resid injection nozzle module FNM121A is isolated on the upstream side by the double block valves MV123A and MV124A, and bleed valves MV127A, MV128A and is isolated and bled on the downstream side of the feed injection nozzle module FNM121A by block valves MV129A and MV130A and bleed valves MV131A and MV132A. The feed injection nozzle module FNM121A can, therefore, be isolated during operation of the injector module and removed and replaced, if necessary. This is a unique feature of the assembly.

The resid oil is broken down inside the feed injection nozzle module FNM121A with steam and the mixture is carried to the catalyst in the riser section, or equivalent section in other processes, through the injector module to an inserted nozzle. Through this complete pathway inside the injector module to the inserted nozzle assembly, the same profile of the passageway as required by the individual arrangements from different sources is maintained. The nozzle insert protrudes through the piping wall and in some cases through refractory or other liner materials. In some embodiments, this nozzle insert is made from solid stellite to provide resistance to wear from the severe erosion that can take place in these types of environments. The inserted nozzle is also able to be removed from the piping and liner assembly during operation of the injector module in a safe manner. A hydraulic puller designed specifically for this function can be used for maintenance on the nozzle inserts if they wear. The nozzle inserts can be pulled back through a packing with the hydraulic extractor and then the process function of the catalyst can be isolated with MV109A and MV110A and detection that these valves are holding properly can be made with MV111A and MV112A as they are open to the atmosphere and can be used to prove that the MV109A and MV110A valves are holding when isolated. Steam purge through these valves when closing is maintained to prevent catalyst from entering into valve assemblies MV109A, MV110A, MV111A, or MV112A.

Steam Control System

Dispersion Steam Control to the Injection Nozzles

In one illustrative embodiment, injector module controls dispersion steam in the following manner. Hydraulic oil is supplied under pressure to the injector module to control the position of the controlling and safety valves which operate the injector module unit. Specifically, hydraulic solenoid valve SOL3 is a normally closed solenoid valve that when de-energized removes the piloting pressure from logic valve PCV22. Solenoid valve SOL3 when de-energized provides piloting hydraulic fluid pressure to the activating port on logic valve PCV22, thus causing the valve to open. The logic valve is therefore a digital valve—meaning it is either open or closed, and is a simple and reliable two position two port valve. The solenoid valve SOL3 is a three port, two position valve. The failsafe nature of this circuit provides the dispersion steam supply continuously to the injector module and to the rest of the circuit when SOL3 is de-energized. SOL3 must be de-energize if the flow of steam to the system is to be stopped.

This same circuit is duplicated in SOL3A and PCV22A for redundancy of the control function. This duplication is provided as most applications require absolute reliability, so a redundant system assures this functionality that is generally required. If redundancy is not desired by the end user, the second circuit is not installed easily as each of these circuits is built into a function block assembly which can be bolted on or removed simply by unbolting and using a cover plate for that particular location.

PCV22A is located in the dispersion steam line and either blocks the flow of steam to the injector module control modules or permits the flow to occur during normal and emergency conditions. This function is provided to maintain safe operation in the case of emergency conditions, also so that steam is always supplied to the injector module. Condensate will occur if the SOL3A solenoid valve is energized during operation, so condensate control valves should be provided by the user.

As dispersion steam passes the isolation valves PCV22 or PCV22A, it enters into a third control module 302 which is an assembly where controlling valves and isolation valves are located. This assembly consists of a servo control modulating valve SSV3A which is able to be isolated by means of double block valves MV141A, MV142A, MV143A and MV144A on the upstream and downstream positions. These isolation valves MV141A, MV142A, MV143A, and MV144A maintain the state of and provide proper isolation with atmospheric bleed valves MV145A, MV146A, MV147A, MV148A. These valves are designated for each individual injection point with letters A, B, C etc. for each of the above valves. The SSV3A valve can be electrically operated as a servo solenoid or proportional type valve or is supplied as a hydraulically controlled servo modulating control valve. Within the block valves described above and associated with the servo control modulating valve SSV3A are the following components:

flow meter transmitter FT141A;
pressure transmitter PT141A; and
pressure gauge PG141A.

The above components are located downstream of SSV3A and upstream of flow transmitter FT141A. The following two components are located downstream of flow transmitter FT141A:

pressure transmitter PT142A; and
pressure gauge PG142A.

The above items can all be isolated at the same time by means of servo solenoid valve SSV3A, with manual valves MV141A, MV142A, MV143A, and MV144A. This provides a maintenance capability for changing any of the components in this group during operation. Therefore, the SSV3A, PT141A, PG141A, FT141A, PT142A, PG142A can all be individually removed and replaced during operation of the DCCM safely and in a provable safe manner.

The purpose of a third control module 302 is to control the dispersion steam flow to feed injection nozzles FNM101A or FNM121A for each particular control circuit of the feedstock gas or resid oils. Flow of dispersion steam is measured for each individual injection nozzle circuit, pressures upstream by pressure transmitter PT141A, pressure gauge PG141A and downstream by PT142A, PG142A of flow transmitter FT141A are provided so data comparison can be made between the upstream and downstream pressures of flow transmitter FT121A and is correlated to flow at different pressures supplied and at different flowrates. Further, control valve SSV3A can be used to adjust the flow of dispersion steam so that adjustment of the entire number of nozzles can be made while online to find the optimum flow for different feedstock materials and pressures, temperatures, and types.

Feedstock injection nozzle module FNM101A or FNM121A is isolated on the dispersion steam upstream side by double block valves MV149A and MV150A and bleed valves are provided as MV151A, MV152A.

Feed injection nozzle module FNM101A or FNM121A can, therefore, be fully isolated during operation of the DCCM and removed and replaced if necessary. This is a unique feature of the assembly.

Emergency Steam to the Injection Nozzles

In one embodiment, the injector module controls the emergency steam in the following manner. Hydraulic oil is supplied under pressure to the injector module to control the position of the controlling and safety valves which operate the injector module unit. Specifically, hydraulic solenoid valve SOL4 is a normally closed solenoid valve that when de-energized removes the piloting pressure off of logic valve PCV26. This solenoid valve SOL4 when de-energized provides piloting hydraulic fluid pressure to the activating port on the logic valve PCV26, thus causing the valve to open. The logic valve is therefore a digital valve—meaning it is either open or closed, and is a simple and reliable two position two port valve. The solenoid valve SOL4 is a three port, two position valve. The failsafe nature of this circuit provides dispersion steam continuously to injector module as well as to the rest of the system when SOL4 is energized. SOL4 must be de-energize to stop the flow of steam to the system.

This same circuit is duplicated with SOL4A and PCV26A for redundancy of control function. This duplication is provided as most applications require absolute reliability, so a redundant system assures this functionality that is generally required. If redundancy is not desired by the end user, the second circuit is not installed easily as each of these circuits is built into a function block assembly which can be bolted on or removed simply by unbolting and using a cover plate for that particular location.

PCV26A is located in the emergency steam line and blocks the flow of steam to injector module injection nozzle module FNM101A or FNM121A directly to the connection point of each dispersion steam going to each nozzle. This function is provided to lift the catalyst up the riser in a typical process during an emergency situation where feedstock oil or resid are diverted away from the injector module. This maintains safe operation under emergency conditions and keeps the catalyst from being slumped in the riser which is a critically bad situation if it occurs. Condensate will occur if the SOL4 solenoid valves are energized during operation, so condensate control valves should be supplied by the user.

As emergency steam passes isolation logic valve PCV26 or PCV26A, it has a control section module which consists of a flow transmitter FT161A and double block (isolation) valves MV161A, MV162A, MV163A, MV164A in the upstream and downstream positions of the flow transmitter. These isolation valves MV161A, MV162A, MV163A, and MV164A are able to hold and provide proper isolation via bleed valves MV165A, MV166A, MV167A, MV168A valves to atmosphere. These valves are designated for each individual injection point with letters A, B, C, etc. for each of the above valves. The following components are located downstream of the split for each nozzle:

flow meter transmitter FT161A;
pressure transmitter PT161A; and
pressure gauge PG161A.

The above items can all be isolated with manual valves MV161A, MV162A, MV163A, and MV164A. This combination provides maintenance capability for changing any of the components in this group during operation. Therefore, PT161A, PG161A, FT161A can all be individually removed and replaced during operation of the DCCM safely and in a provable safe manner.

The purpose of a fourth control module 304 is to control the emergency steam flow to the feed injection nozzles FNM101A or FNM121A for each particular control circuit of the feedstock gas or resid oils. Flow of emergency steam is measured for each individual injection nozzle circuit, pressures upstream by PT161A, PG161A of flow transmitter FT161A provide data comparison to assure the proper amount of emergency steam is getting to each nozzle and to the riser assembly.

Feedstock injection nozzle module FNM101A or FNM121A is isolated from emergency steam lines by the same valves that isolate the dispersion steam. These valves include block valves MV149A and MV150A, with bleed valves also provided as valves MV151A, MV152A.

Additional instrumentation provided on an as needed basis includes sound sensors on all, or at least some, of the nozzle insert assemblies. These sensors indicate the condition of the nozzles. These sensors may not be needed due to the unique design of the nozzle inserts as wear or erosion are not believed to be an issue. If sound is an issue, then the sound sensors can be used to indicate the condition of a nozzle.

Further, temperature indicators for the risers located in several locations on the liner of the injector module can be incorporated on a custom basis to indicate the health of the refractory. This indication would prevent any erosion that might occur from forming a hole through the main body of the DCCM.

Temperature transmitters TT181 and TT182 are provided on the main header of the injector module ports for the gas oil main feedstock port and for the resid feedstock port. These temperatures are used along with density indicators provided by an end user to determine in part the flowrate and the mixing percentages to be used in the output maximizing program for the DCCM to execute.

Controller Assembly

A controller, such as DCCM 14, is provided to monitor, record and control the following components and points within the FCC system:

In some embodiments, control functions of DCCM include:
1. All servo control valves for feedstock gas oil;
2. All servo control valves for resid feedstock oil;
3. All solenoid valves for feedstock gas oil; and
4. All solenoid valves for resid feedstock oil.

In some embodiments, data is collected from:
1. Feedstock gas oil temperature TT181;
2. Feedstock resid oil temperature TT182;
3. Steam supply temperature TT183;
4. Pressure transmitters for feedstock gas oil PT101A, PT102A;
5. Pressure transmitters for feedstock resid oil PT121A, PT122A;
6. Pressure transmitters for dispersion steam PT141A, PT142A;
7. Pressure transmitters for emergency steam PT161A;
8. Flow transmitters for feedstock gas oil FT101A;
9. Flow transmitters for feedstock resid oil FT121A;
10. Flow transmitters for dispersion steam FT141A;
11. Flow transmitters for emergency steam FT161A; and
12. Sound sensors for individual nozzles as needed.

In some embodiments, a minimum of 12 nozzles is used. In some embodiments, 18 to 24 nozzles are used. In some embodiments, up to 30 nozzles are used. In some embodiments, more than 30 nozzles are used. The number of nozzles may be increased or decreased depending on the size of the standpipe being fed by the nozzles. The DCCM will take the data for the setpoint flowrate from the refinery or chemical or other industrial process and will adjust the flow rate through each nozzle system to provide a combined total flowrate to meet the setpoint. Additional data combined with temperatures, mass density and other factors from other sections of the system that would affect yield are monitored for total output conversion into usable product. This means that input from outside would be minimally:
1. Riser temperature data points;
2. Total catalyst circulation rate;
3. Total carbon make on catalyst;
4. Total yield recovered in the vapor recovery unit;
5. Total liquid product make;
6. Oxygen content at the flue gas stack;
7. Opacity input for the catalyst going out the stack;
8. Catalyst activity; and
9. Catalysts fines make.

With these data points, adjustment to dispersion steam is made to maximize liquid yield and to reduce overall carbon make on the catalyst. This data can be used to understand the performance of each nozzle. This data can further be used to determine the extent of deterioration of the catalyst and, therefore, the amount of catalyst fines reduction that could help opacity on the stack meters, and the total emissions of $CO_2$ and CO to the atmosphere.

Figure 13:
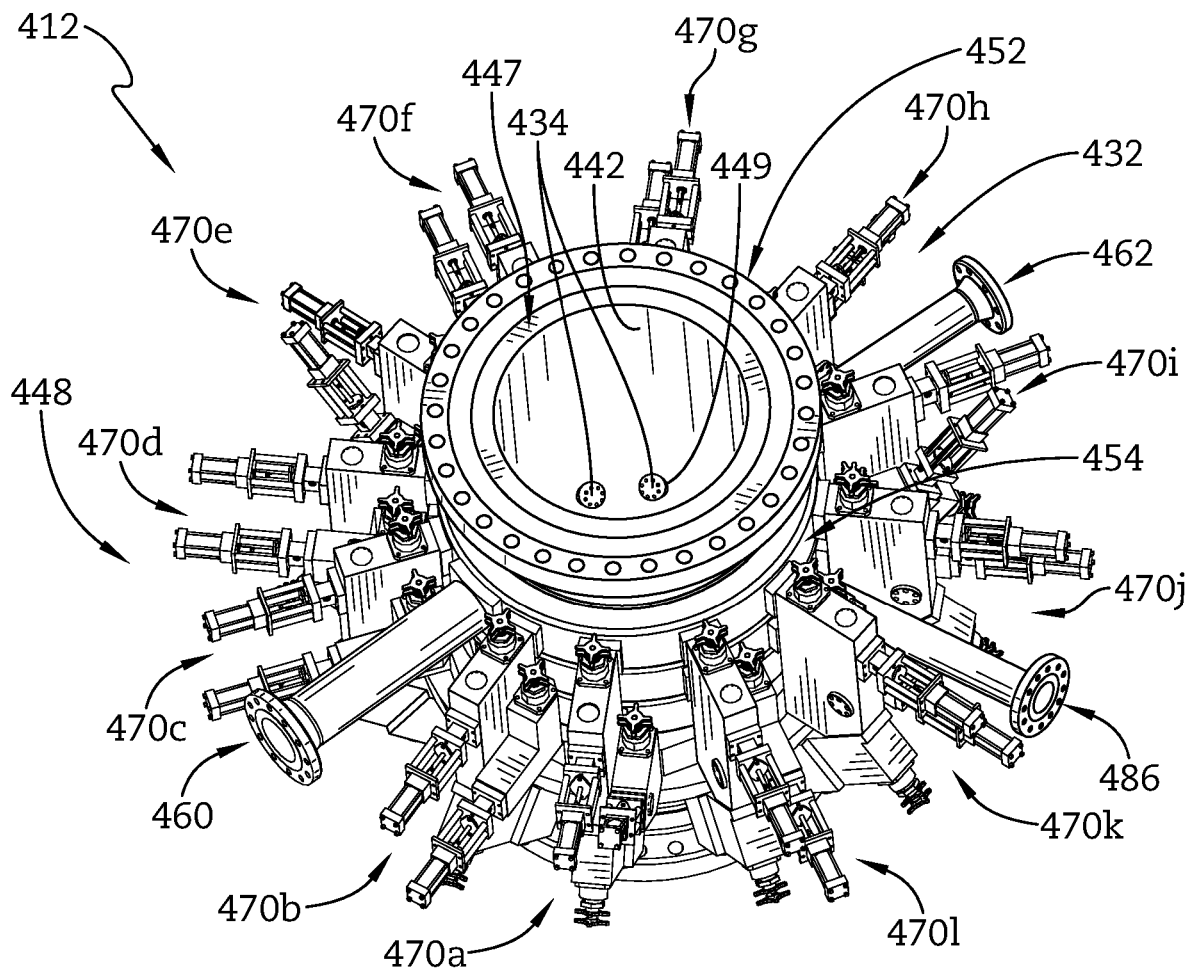
FIG. 13 is an upper perspective view of another embodiment of an injector module.
Figure 14:
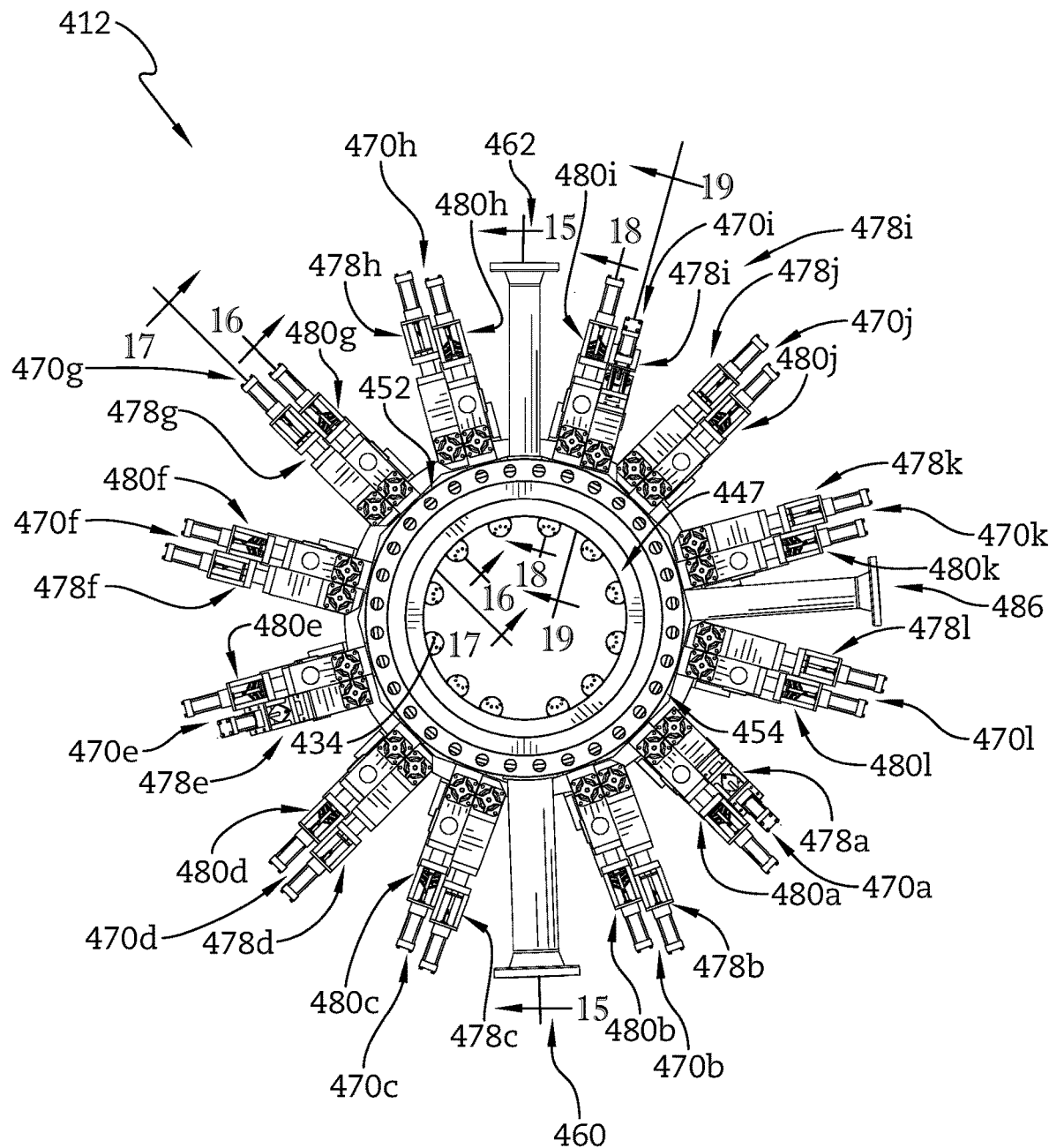
FIG. 14 is a side elevation view of the injector module of FIG. 13.

Another embodiment of an injector module 412 in accordance with the present disclosure for use in FCC unit 100 is shown in FIGS. 13 and 14. Injector module 412 includes a plurality of nozzles 434 coupled to a manifold 432. Manifold 432 includes a central tube 452, a flow network 454, and a flow control assembly 448. A steam input tube 460, feedstock oil input tube 462, and resid oil input tube 486 are coupled to flow network 454 to supply manifold 432 with feedstock oil, resid oil, and steam. The feedstock oil, resid oil, and steam flow through manifold to nozzles 434. The flow of feedstock oil, resid oil, and steam is controlled by flow control assembly 448 as directed by DCCM 14. Nozzles 434 are arranged to extend through openings 449 formed through an inner surface of central tube 452, and refractory liner 447, such that nozzles 434 can direct fluid into central tube 452.

Flow control assembly 448 includes a plurality of flow controllers 470a-470l coupled to flow network 454 and circumferentially spaced from one another as suggested in FIGS. 13 and 14. Each flow controller 470a-470l includes a steam control block 480a-480l, respectively, and an oil control block 478a-478l, respectively. In the illustrative embodiment, oil control blocks 478a, 478c, 478i are configured to control a flow of resid oil through manifold 32 towards nozzles 34 while the remaining oil control blocks are configured to control a flow of feedstock oil as further detailed below. As such, three nozzles are arranged to direct resid oil into central tube 452 while the remaining nozzles are arranged to direct feedstock oil into central tube 452. Any combination of oil control blocks is possible, including more or less oil control blocks for controlling a flow of resid oil through manifold 32.

Figure 15:
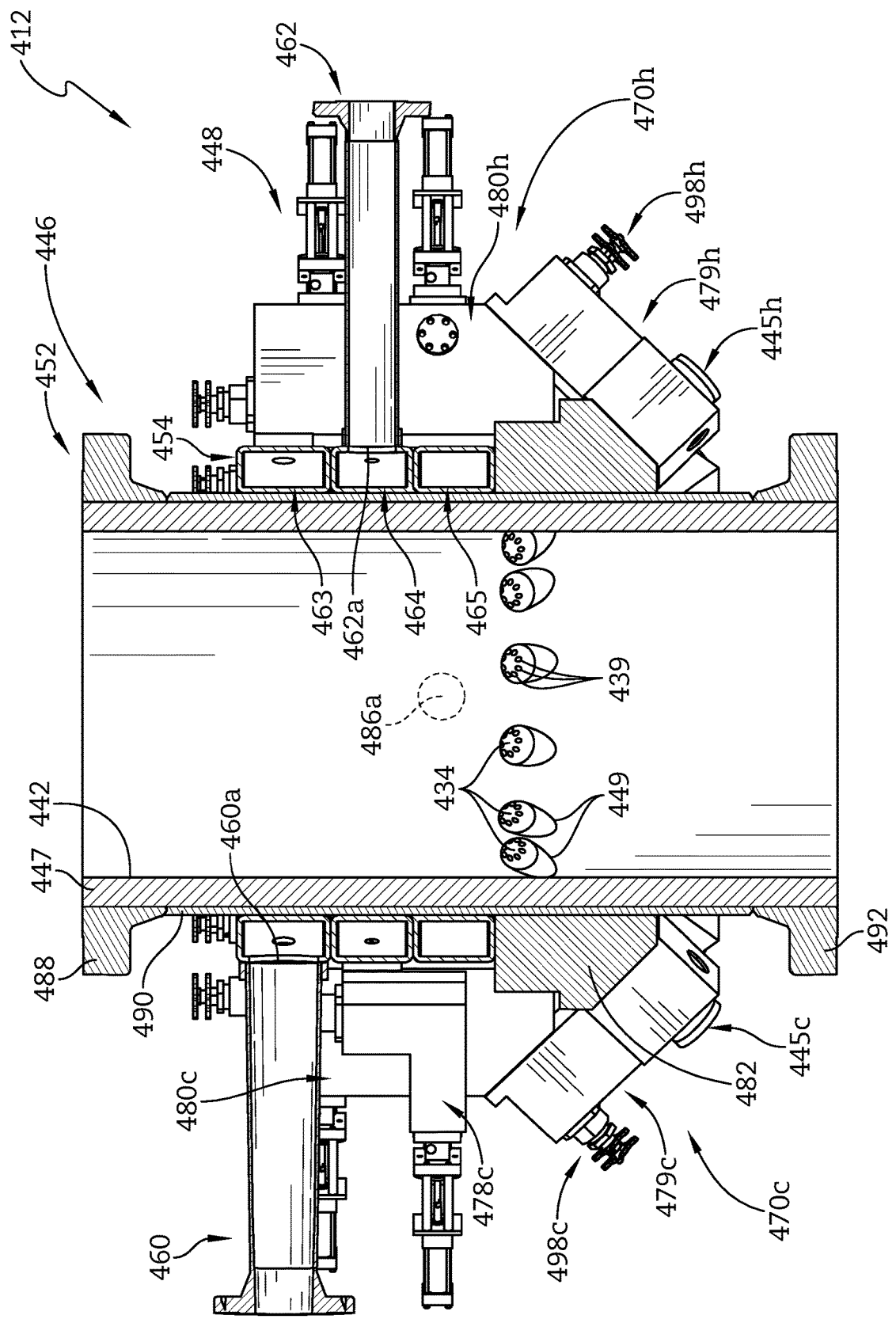
FIG. 15 is a sectional view taken along line 15-15 in FIG. 14.

Flow network 454 includes a plurality of annular feed plenums 463, 464, 465 arranged to surround central tube 452 to direct fluid around manifold 432 for distribution to flow controllers 470a-470l and nozzles 434 as suggested in FIG. 15. Steam input tube 460 is coupled to a steam feed plenum 463 and configured to direct steam through an inlet opening 460a into steam feed plenum 463 to fill steam feed plenum 463 with steam. Feedstock oil input tube 462 is coupled to an oil feed plenum 464 and configured to direct feedstock oil through an inlet opening 462a into oil feed plenum 464 to fill oil feed plenum 464 with feedstock oil. Resid oil input tube 486 is coupled to a resid oil feed plenum 465 and configured to direct resid oil through an inlet opening 486a into resid oil feed plenum 465 to fill resid oil feed plenum 465 with resid oil. In some embodiments, resid oil feed plenum 465 is removed when no flow controllers 470a-470l are configured for controlling a flow of resid oil to nozzles 434.

In the illustrative embodiment, central tube 452 includes a pipe section 490 and a pair of flanges 488, 492 coupled to opposing ends of pipe section 490 as suggested in FIG. 15. In some embodiments, feed plenums 463, 464, 465 are formed prior to attachment of flanges 488, 492 and slid over pipe section 490 into position. In some embodiments, feed plenums 463, 464, 465 are formed from straight sections of tubing which are bent around pipe section 290 and have their ends welded together. An adapter ring 482 is also coupled to central tube 452 and is configured to couple nozzle-feed blocks 479a-479l with central tube 452, though only nozzle-feed blocks 479c and 479h are visible in FIG. 15. In the illustrative embodiment, adapter ring 482 is cast or machined as a unitary component and slid over pipe section 490 into position.

Adapter ring 482 is formed to include a nozzle seat 489g for receiving nozzle 434g as suggested in FIG. 16. Nozzle 434g extends through nozzle-feed block 479g, adapter ring 482, and opening 449g. A cap 445g couples nozzle 434g with nozzle-feed block 479g and covers an open end of nozzle 434g.

Discussion will now be made regarding the flow of feedstock oil and steam through injector module 412 as illustrated for a nozzle 434g and associated flow controller 470g in FIGS. 16 and 17. The below description is applicable to any other flow controller 470a-470l used to direct feedstock oil and steam to one of nozzles 434. In the illustrative embodiment, steam travelling through steam feed plenum 463 passes through a steam supply port 463g and into steam control block 480g of flow controller 470g as suggested in FIG. 16. A platform 421g is positioned between steam feed plenum 463 and steam control block 480g to provide a flat surface for coupling steam control block 480g with steam feed plenum 463. The flow of steam passes through a dual block and bleed valve 485g and toward an intermediate throttling valve 483g. The flow of steam passes through throttling valve 483g and travels toward a mixing chamber 472g.

Feedstock oil travelling through oil feed plenum 464 passes through an oil supply port 464g and into steam control block 480g of flow controller 470g as suggested in FIG. 16. A platform 422g is positioned between oil feed plenum 464 and steam control block 480g to provide a flat surface for coupling steam control block 480g with oil feed plenum 464. The flow of oil passes through a transfer conduit 476g out of steam control block 480g and into oil control block 478g as suggested in FIGS. 16 and 17. The flow of oil passes through a dual block and bleed valve 475g and an intermediate throttling valve 477g toward a transfer conduit 487g as suggested in FIG. 17. The flow of oil travels through transfer conduit 487g and into mixing chamber 472g to mix with the flow of steam as suggested in FIGS. 16 and 17.

The mixed steam and feedstock oil passes out of mixing chamber 472g and into a shut-off valve 498g as suggested in FIG. 16. The flow of mixed steam and feedstock oil travels through shut-off valve 498g and into a nozzle-inlet tube 474g formed in nozzle-feed block 479g. The flow of mixed steam and feedstock oil travels through nozzle 434g and out of nozzle-injection ports 439g formed in nozzle 434g. Various plugs and caps, such as plugs 423g, 424g and cap 445g, are used to seal openings formed during formation of the various conduits through flow controller 470g.

Adapter ring 482 is formed to include a nozzle seat 489i for receiving nozzle 434i as suggested in FIG. 18. Nozzle 434i extends through nozzle-feed block 479i, adapter ring 482, and opening 449i. A cap 445i couples nozzle 434i with nozzle-feed block 479i and covers an open end of nozzle 434i.

Discussion will now be made regarding the flow of resid oil and steam through injector module 412 as illustrated for a nozzle 434i and associated flow controller 470i in FIGS. 18 and 19. The below description is applicable to any other flow controller 470a-470l used to direct resid oil and steam to one of nozzles 434. In the illustrative embodiment, steam travelling through steam feed plenum 463 passes through a steam supply port 463i and into steam control block 480i of flow controller 470i as suggested in FIG. 18. A platform 421i is positioned between steam feed plenum 463 and steam control block 480i to provide a flat surface for coupling steam control block 480i with steam feed plenum 463. The flow of steam passes through a dual block and bleed valve 485*i* and toward an intermediate throttling valve 483*i*. The flow of steam passes through throttling valve 483*i* and travels toward a mixing chamber 472*i*.

Resid oil travelling through resid oil feed plenum 465 passes through a resid oil supply port 465*i* and into steam control block 480*i* of flow controller 470*i* as suggested in FIG. 18. A platform 425*i* is positioned between resid oil feed plenum 465 and steam control block 480*i* to provide a flat surface for coupling steam control block 480*i* with resid oil feed plenum 465. The flow of resid oil passes through a transfer conduit 476*i* out of steam control block 480*i* and into oil control block 478*i* as suggested in FIGS. 18 and 19. The flow of resid oil passes through a dual block and bleed valve 475*i* and an intermediate throttling valve 477*i* toward a transfer conduit 487*i* as suggested in FIG. 17. The flow of resid oil travels through transfer conduit 487*i* and into mixing chamber 472*i* to mix with the flow of steam as suggested in FIGS. 18 and 19.

The mixed steam and resid oil passes out of mixing chamber 472*i* and into a shut-off valve 498*i* as suggested in FIG. 18. The flow of mixed steam and resid oil travels through shut-off valve 498*i* and into a nozzle-inlet tube 474*i* formed in nozzle-feed block 479*i*. The flow of mixed steam and resid oil travels through nozzle 434*i* and out of nozzle-injection ports 439*i* formed in nozzle 434*i*. Various plugs and caps, such as plugs 423*i*, 424*i*, 426*i* and cap 445*i*, are used to seal openings formed during formation of the various conduits through flow controller 470*i*.

In illustrative embodiments, a cracking unit includes a cracking feed, such as gas oil from a vacuum distillation tower which is brought into contact with a hot cracking catalyst at the base of a tall, columnar riser wherein the cracking takes place. The cracking feed travels up the riser to its top concurrently with the catalyst with the cracking product separated from the catalyst in a disengaging vessel, commonly referred to as a "reactor." The reactor includes cyclone separators for separating the catalyst from the cracking products which are then passed to a product recovery section of the unit for separation into various cracked fractions. The separated catalyst is passed to a regenerator, in which the coke laid down by the cracking process is oxidatively removed, thus restoring the catalyst to its active state for providing heat for the endothermic cracking process by the combustion of the coke. The regenerated catalyst is returned to a lower portion of the cracking riser for contact with the cracking feed.

In illustrative embodiments, the nature of the cracking feed injection zone in the catalytic cracking reactor is critical to the overall cracking process. To optimize the cracking process, it is necessary to contact the feed as uniformly as possible with the catalyst so as to procure the catalyst/oil ratio which is most favorable to the desired product yield and distribution. In addition, essentially complete atomization of any unvaporized feed must be effected as fast and as close to the injection zone as possible. In practice, these requirements have given rise to a considerable number of technical problems arising not only from the basic difficulties of achieving uniform contact between a finely-divided solid (the catalyst) and a liquid (the cracking feed), but also because cracking units are generally required to handle very large quantities of both catalyst and cracking feed. In order to improve the efficiency of the catalytic cracking process, it is desirable to have the feed molecules reach the active catalyst particles to the maximum extent possible and in the shortest possible time frame.

During operation of a typical FCC Unit and process, no nozzle can be replaced. This is a significant limitation because the yield of the FCC is directly related to nozzle integrity, and the cost to replace a nozzle can be very high. Presently, a single valve controls the flow of feed into the riser as well as the bypass flow back to the fractionator of the catalyst. This valve operates very slowly and is prone to failure. The valves and actuators involved with the introduction of emergency steam for lifting the catalyst in the riser are also slow in operation and sometimes fail to provide the emergency steam in a timely manner.

In illustrative embodiments, the injector module can be used in other processes where fluid mixing of two or more products occurs.

In illustrative embodiments, the injector module of the present disclosure increases a yield in feed conversion in an FCC system by the use of multiple nozzles and nozzles of reduced size for greater control over oil feedstock distribution and input, resulting in the need for less combustion air in the process. The need for less combustion air is due to less carbon being deposited on the catalyst which must be burned off by the combustion air. The increased efficiency and the reduced carbon deposited on the catalyst with less air consumption results in less pollutants being discharged to the atmosphere. This represents a substantial benefit to the refiner seeking to meet federal and state requirements on emissions from the refinery. In other words, the refiner can use the same amount of air and discharge to the atmosphere the same amount of emissions per its federal and state licenses, but can increase the throughput of the FCC Unit, or other process, resulting in greater efficiency and profitability.

In illustrative embodiments, the nozzle insert, when located in the injector module and extending through the refractory liner, permits wear of the tip surface without any degradation in the nozzle shape. The shape of the port of the nozzle can affect dispersion of the feed oil into the process. The disclosed nozzle insert maintains the same port pattern throughout its operating lifetime, and provides the same injection pattern all the way through and will not erode and assume a different shape.

In illustrative embodiments, the internal network of piping formed in the block simplifies and reduces the feedstock piping and other external piping which is typically required to feed each nozzle. A unitary monitoring and control module for controlling an injector module in an FCC process can easily be incorporated by retrofitting in existing FCC reactors.

In illustrative embodiments, multiple temperature indications of the liner outside surface of the injector module, such as in four to six locations, is monitored by the DCCM to monitor the health and condition of the refractory. This is to assure the refractory condition is satisfactory for continued operation. Further, the injector module is controlled in such a way as to provide much greater control of each function taking place at individual injection points rather than providing overall control of the entire system on a macro basis. Therefore, the DCCM feed injection system provides an increased throughput with greater efficiency due to the greater number and more precise control over the system monitoring and control locations.

In illustrative embodiments, a feedstock injector module for use in continuous cyclical processes employing fluidized solid techniques, e.g., a hydrocarbon fluid catalytic cracking (FCC) process, is provided in the form of a solid block of high strength, heat resistant material which includes a plurality of nozzles integrally formed in the injector module for spraying feedstocks via integrally formed passageways and nozzles into the riser vessel, or reactor. This arrangement permits the use of increased numbers of smaller nozzles for improved atomization and greater flexibility in feedstock spray patterns providing increased output yield. The module is disposed about the riser and extends into the feedstock flow profile in the reactor. The injector module is easily replaced as a single unit in the reactor, and includes multiple feedstock passageways to accommodate various feedstocks such as gas oil, medium light cycle oil, and resid oil, as well as steam, for simultaneous injection into the reactor.

In illustrative embodiments, separate nozzles are provided within the interior of the standpipe for the feed oil and the resid oil. The number of nozzles depends upon the diameter of the standpipe. Emergency steam is introduced into the standpipe separate and apart from the introduction of the steam used in atomizing the oil feedstock.

In illustrative embodiments, in a refinery process of a fluidized catalyst cracking unit (FCCU), nozzles stick into a vertical pipe that inject oil onto catalyst. These nozzles have a tip on the end of them that spray the oil in much of the same way as a high pressure sidewalk washer or building washer would work as a spray nozzle that leaves generally a flat spray and the spray pattern is made in such a way to form as much coverage of the inside of that pipe with multiple nozzles around the outside of the pipe as is possible.

In illustrative embodiments, the equipment sprays oil on a catalyst. The catalyst is about the size of small sand particles. Oil is spayed in the catalyst and oil temperature is around 450-500 degrees. The catalyst itself is at 1300 degrees Fahrenheit when the oil contacts it, and it vaporizes the oil almost immediately and that vapor is station going from liquid to vapor phase increases the volume dramatically and it lifts the catalyst up vertically. The reacting mixture enters another vessel where the catalyst is actually separated from the vapor and reused in the process.

There has previously been a particular limit in how many nozzles can be put into a certain diameter of pipe. One reason for this is that the nozzles themselves are large and fill significant portions of the pipe and adding more would cause them to contact one another. As such, the problem is how to get more nozzles into the pipe. So for example, about four nozzles would previously fit in a small pipe diameter of 24 inches. Using the injector module of the present disclosure, 12 nozzles will fit in a pipe diameter of 24 inches. Previously, in a 30 inch diameter pipe, 5 to 6 nozzles would fit. Using the injector module of the present disclosure, 16 nozzles will fit in a pipe diameter of 30 inches. Using the injector module of the present disclosure, 18-20 nozzles will fit in a pipe diameter of 40 inches. Using the injector module of the present disclosure, 32 nozzles will fit in a pipe diameter of 60 inches.

In illustrative embodiments, instead of a 6 inch nozzle, or a 4 inch nozzle, a 1½ or 2 inch nozzle is used. As such, previously there was dispersion coverage of about 65% to 80%. Using the injector module of the present disclosure, dispersion coverage of about 94% to 95% can be realized, and up to 99% depending on the size of pipe and number of nozzles used.

Another problem is making an assembly where a nozzle can be pulled out while the unit is in service. In other words, remove it from service that actually replace the nozzle in case something goes wrong with it.

In illustrative embodiments, you can tune the FCC unit to either make more gasoline or more kerosene depending on how you arrange the pressures and the textures that you are operating at. It is estimated that using the injector module of the present disclosure, a 2% gain of yield is experience over other processes. The cracking process separates the oil into gases to convert them into gasoline, kerosene, naphtha, butane and down to the light cycle oils or heavy cycle oils.

In illustrative embodiments, the disclosed design is able to control the flow rate of oil through each nozzle. The system includes a set point for feed for the total amount of feed going to the riser to permit distribution of oil to all of those nozzles in the system. Oil feed is automatically controlled through a control valve and instrumentation associated with the control valve. The feed oil of the present system is controlled with the control valve and a PLC program that controls the valve to an overall set point that includes a flow meter for each feed nozzle. They system also includes a pressure transmitter on each feed nozzle upstream and downstream of the overall control. With this system, the operator knows how much flow is going through each nozzle and the pressure at which each of the nozzles are operating. From a diagnostic stand point, the operator knows whether each nozzle is working or not or whether it is plugged up or whether it is eroded or whether it is not working right. In some embodiments, tips of the nozzles are made of a stelite material which is heat and abrasion resistant.

In illustrative embodiments, each nozzle includes feed oil and steam. There are two different steam flows coming into the nozzle, disperse steam and an overall control steam. The system includes control valves, flow transmitters, and pressure transmitters to control the steam. If a steam pressure header loses pressure an alarm sounds and the operator can reduce system pressures until the problem can be resolved. The steam control allows the operator to change the amount and rate of steam for different feed stocks coming into the unit. Current systems only have aggregate control of steam, meaning one steam control valve that operates to all of the feed nozzles and one aggregate control valve on the feed side for all of those nozzles. The present disclosure include individualized steam to each feed nozzle and an operator is to control each feed nozzle individually with both steam and with feed and mix them accordingly, automatically to a certain riser temperature, to a certain flow rate. These factors are controlled by the plc program and the distributor control system.

In illustrative embodiments, the system includes one manifold ring for feed, one manifold ring for steam and the steam is divided up between the two flows of steam within the block. The system also includes a third ring that is used for a different feed stock, such as recycled oil. Recycled oil is usually a heavier stock oil. Before recycled oil goes into most refineries, it is put into the riser of the FCC unit to separate out gasoline from the heavy residual. The present system includes the third ring so that residual oil can be mixed with the feed oil. The third manifold ring includes an individual steam ring so that residual oil can be adjusted. The present disclosure allows an operator to mix the residual oil and the feed oil and send the blended oil into the nozzles. The system allows an operator to set a particular nozzle to be fed just by the residual oil or they can create a mixture of both residual oil and gas oil.

In illustrative embodiments, since the present system is one block there are a minimized number of connections coming through the block. The first connection is for feed oil, which, in the example is delivered by a 6, 8 or 10 inch pipe, depending on the size of the unit. The second connection to the block is for steam. The third connection to the block is for residual oil. The fourth connection is for condensate that is removed from the steam manifold ring.

In illustrative embodiments, block sections are bolted together using a tortuous pathway of mating surfaces to eliminate leaking. In some embodiments, a carbon based or metal foil gasket is placed between mating blocks to form seals. This arrangement eliminates the potential flange leaks that take place at each one of the flange points in a typical pipe system. The block utilize cartridge valves. The cartridge valve is a valve that is positioned down into the block of steel. The cartridge valve can seal up different ports and the valve can have two ports coming through the valve, three ports coming through the valve or four.

While particular embodiments of the present disclosure have been described, it will be obvious skilled in the relevant arts that changes and modifications may be made without departing from the disclosure in its broader aspects. Therefore, the aim in the appended claims is to cover all such changes and modifications that fall within the true spirit and scope of the disclosure. The matters set forth in the foregoing description and accompanying drawings is offered by way of illustration only and not as a limitation. The actual scope of the disclosure is intended to be defined in the following claims when viewed in their proper perspective based on the prior art.

The invention claimed is:

1. A fluid injection system for a fluid catalytic cracking unit having a cracking standpipe into which oil, steam, and a catalyst are introduced at elevated pressure and temperature to crack the oil into constituent portions, the fluid injection system comprising:
a manifold coupled to the cracking standpipe, the manifold having plurality of inner passages for distributing flows of oil and steam through the manifold, a plurality of inlets in fluid communication with the plurality of inner passages, and a plurality of outlets separated from the plurality of inlets and in fluid communication with the plurality of inner passages;
a plurality of separate mixing chambers circumferentially disposed about the manifold, each mixing chamber configured to atomize oil supplied to the mixing chamber and mix the atomized oil with steam supplied to the mixing chamber;
a plurality of multiflow control blocks circumferentially disposed about the manifold and coupled to the plurality of outlets, each multiflow control block configured for controlling the flows of oil and steam into a corresponding one of the plurality of mixing chambers; and
a plurality of nozzles circumferentially disposed about the standpipe and extending through respective apertures into the standpipe, the plurality of nozzles in fluid communication with the plurality of mixing chambers for directing the oil and steam mixture into the standpipe in a controlled manner for reaction with the catalyst.

2. The fluid injection system of claim 1, wherein each of the multiflow control blocks includes a plurality of valves for controlling the flows of oil and steam into the corresponding mixing chamber.

3. The fluid injection system of claim 2, wherein each of the valves is a dual block and bleed valve.

4. The fluid injection system of claim 3, wherein each of the dual block and bleed valves includes first and second independently movable members for either blocking or allowing the flow of oil or steam through the valve.

5. The fluid injection system of claim 3, wherein each of the dual block and bleed valves comprises:
a housing having an axial bore and an annular seat, the housing formed to include a first port formed through the housing and positioned on a first side of the annular seat and a second port formed through the housing and positioned on a second side of the annular seat opposite the first side,
a first stem having an annular body and a first plug end coupled to a first end of the annular body, a second end of the annular body received in the bore of the housing such that the first plug end is positioned on the first side of the annular seat, the first stem configured to move axially relative to the housing between an open position where the first plug end is spaced apart from the annular seat and a closed position where the first plug end is engaged with and seated against the annular seat to seal an opening through the annular seat, and
a second stem having a shaft and a second plug end coupled to a first end of the shaft, a second end of the shaft received in the annular body of the first stem such that the second plug end is positioned on the second side of the annular seat, the second stem configured to move axially relative to the housing between an open position where the second plug end is spaced apart from the annular seat and a closed position where the second plug end is engaged with and seated against the annular seat to seal the opening through the annular seat,
wherein the annular seat is formed to include a bleeder port extending through the housing and configured to provide means for passing a fluid received in the housing through one of the first or second ports out of the housing until at least one of the first and second plug ends is seated against the annular seat.

6. The fluid injection system of claim 1, further including a plurality of shutoff valves, each shutoff valve configured to block fluid communication between corresponding ones of the plurality of mixing chambers and plurality of nozzles at the selection of a user.

7. The fluid injection system of claim 6, further including a plurality of threaded couplings attaching a respective nozzle to an inner portion of the manifold in a removable manner.

8. The fluid injection system of claim 7, further including a removal tool coupled to one of the nozzles and engaging the manifold for removing the nozzle from the manifold in a sealed manner during operation of the fluid catalytically cracking unit and preventing unwanted escape of oil and steam from the standpipe.

9. The fluid injection system of claim 8, wherein the removal tool is adapted for replacing the first nozzle with a second nozzle while preventing escape of oil and steam from the standpipe.

10. The fluid injection system of claim 1, wherein the flow of oil is provided to a corresponding inner passage of the plurality of inner passages at a pressure between about 50 and 300 psig and at a temperature of about 500° F., and the flow of steam is provided to a corresponding inner passage of the plurality of inner passages at a pressure between about 50 and 350 psig and at a temperature of about 550° F.

11. The fluid injection system of claim 1, wherein the plurality of inner passages includes at least a first inner passage defining a first plenum for distributing the flow of oil around the manifold to a first set of outlets of the plurality of outlets and a second inner passage defining a second plenum for distributing the flow of steam around the manifold to a second set of outlets of the plurality of outlets.

12. The fluid injection system of claim 11, wherein each multiflow control block includes an oil control block coupled to a corresponding outlet of the first set of outlets and a steam control block coupled to a corresponding outlet of the second set of outlets, and wherein the oil control block and steam control block are coupled to a corresponding mixing chamber of the plurality of mixing chambers.

13. The fluid injection system of claim 12, wherein the multiflow control blocks are disposed substantially symmetrically on the manifold about the standpipe.

14. A fluid injection system for a fluid catalytic cracking unit having a cracking standpipe into which oil, steam, and a catalyst are introduced at elevated pressure and temperature to crack the oil into constituent portions, the fluid injection system comprising:
- a manifold having plurality of inner passages for distributing flows of oil and steam through the manifold, a plurality of outlets in fluid communication with the plurality of inner passages;
- a plurality of separate mixing chambers arranged around the manifold, each mixing chamber configured to mix oil with steam supplied to the mixing chamber;
- a plurality of multiflow control blocks arranged around the manifold, each multiflow control block configured for controlling the flows of oil and steam into a corresponding one of the plurality of mixing chambers from corresponding outlets of the plurality of outlets; and
- a plurality of nozzles circumferentially disposed about the standpipe and extending through respective apertures into the standpipe, the plurality of nozzles in fluid communication with the plurality of mixing chambers for directing the oil and steam mixture into the standpipe in a controlled manner for reaction with the catalyst.

15. The fluid injection system of claim 14, wherein each of the multiflow control blocks includes a plurality of valves for controlling the flows of oil and steam into the corresponding mixing chamber.

16. The fluid injection system of claim 14, wherein the plurality of inner passages includes at least a first inner passage defining a first plenum for distributing the flow of oil around the manifold to a first set of outlets of the plurality of outlets and a second inner passage defining a second plenum for distributing the flow of steam around the manifold to a second set of outlets of the plurality of outlets.

17. The fluid injection system of claim 16, wherein each multiflow control block includes an oil control block coupled to a corresponding outlet of the first set of outlets and a steam control block coupled to a corresponding outlet of the second set of outlets, and wherein the oil control block and steam control block are coupled to a corresponding mixing chamber of the plurality of mixing chambers.

18. The fluid injection system of claim 14, further including a plurality of shutoff valves, each shutoff valve configured to block fluid communication between corresponding ones of the plurality of mixing chambers and plurality of nozzles at the selection of a user.

* * * * *